US008812334B2

(12) United States Patent
Givens et al.

(10) Patent No.: US 8,812,334 B2
(45) Date of Patent: Aug. 19, 2014

(54) WELL PLANNING SYSTEM AND METHOD

(75) Inventors: Kris Givens, Katy, TX (US); Daan Veeningen, Houston, TX (US); James Brady, Houston, TX (US)

(73) Assignee: Schlumberger Technology Corporation, Houston, TX (US)

(*) Notice: Subject to any disclaimer, the term of this patent is extended or adjusted under 35 U.S.C. 154(b) by 1835 days.

(21) Appl. No.: 11/708,861

(22) Filed: Feb. 21, 2007

(65) Prior Publication Data

US 2007/0199721 A1      Aug. 30, 2007

Related U.S. Application Data

(60) Provisional application No. 60/777,143, filed on Feb. 27, 2006.

(51) Int. Cl.
| | |
|---|---|
| G06F 17/30 | (2006.01) |
| G06F 9/44 | (2006.01) |
| G06Q 10/06 | (2012.01) |
| E21B 43/00 | (2006.01) |

(52) U.S. Cl.
CPC .......... *G06Q 10/06312* (2013.01); *E21B 43/00* (2013.01)
USPC ..... 705/7.11; 705/7.22; 707/654; 166/250.16

(58) Field of Classification Search
CPC .............................................. G06Q 10/06312
USPC .......... 705/7.17, 7.25, 7.11, 7.22, 8; 166/345; 703/10; 707/654
See application file for complete search history.

(56) References Cited

U.S. PATENT DOCUMENTS

| 5,139,094 A | 8/1992 | Prevedel et al. |
| 5,680,906 A | 10/1997 | Andrieux et al. |

(Continued)

FOREIGN PATENT DOCUMENTS

| GB | 2392931 A | 3/2004 |
| GB | 2411669 A | 9/2005 |

(Continued)

OTHER PUBLICATIONS

"Software Application Optimizes Well-Planning and Risk-Assessment Process", Feb. 2004, Technology Update, 2 pps (26 and 80).*
Bourgeois et al., "Improving Well Placement with Modeling While Drilling"; Winter 2006/2007; Oilfield Review, pp. 20-29.*
Nagy et al., "Rock Physics: Understanding the Geomechanics Risk", Oct. 2005, E&P, 2 pages.*

(Continued)

*Primary Examiner* — John Hayes
*Assistant Examiner* — Freda A Nelson
(74) *Attorney, Agent, or Firm* — Cuong Lam Nguyen; Rodney Warfford; Robert Lord

(57) ABSTRACT

A method for performing oilfield operations for an oilfield having a subterranean formation with an underground reservoir therein, the oilfield being provided with at least one wellsite with oilfield equipment for extracting fluid from the underground reservoir, involving collecting data comprising trajectory and earth properties associated with a planned well for a geoscience application to obtain a geoscience model, invoking a well planning system integrated with the geoscience application, extracting the trajectory and earth properties from the geoscience model to obtain an extracted trajectory and extracted earth properties, determining at least one parameter for the planned well based on the extracted trajectory and the extracted earth properties, and displaying the at least one parameter associated with the planned well within a geological context of the geoscience application to allow refinement of the planned well for efficient fluid extraction from the underground reservoir.

29 Claims, 13 Drawing Sheets
(7 of 13 Drawing Sheet(s) Filed in Color)

(56) References Cited

U.S. PATENT DOCUMENTS

| | | | |
|---|---|---|---|
| 5,899,958 | A | 5/1999 | Dowell et al. |
| 5,992,519 | A | 11/1999 | Ramakrishnan et al. |
| 6,266,619 | B1 | 7/2001 | Thomas et al. |
| 6,313,837 | B1 | 11/2001 | Assa et al. |
| 6,980,940 | B1 | 12/2005 | Gurpinar et al. |
| 7,003,439 | B2 * | 2/2006 | Aldred et al. ............ 703/10 |
| 7,079,952 | B2 | 7/2006 | Thomas et al. |
| 7,539,625 | B2 * | 5/2009 | Klumpen et al. ......... 705/7.22 |
| 7,630,914 | B2 * | 12/2009 | Veeningen et al. ....... 705/7.28 |
| 8,224,783 | B1 * | 7/2012 | Burleigh et al. ........ 707/654 |
| 2002/0103630 | A1 | 8/2002 | Aldred et al. |
| 2003/0132934 | A1 | 7/2003 | Fremming |
| 2003/0216897 | A1 | 11/2003 | Endres et al. |
| 2004/0220846 | A1 | 11/2004 | Cullick et al. |
| 2005/0060213 | A1 | 3/2005 | Lavu et al. |
| 2005/0149306 | A1 | 7/2005 | King |
| 2005/0149307 | A1 | 7/2005 | Gurpinar et al. |
| 2005/0209836 | A1 | 9/2005 | Klumpen et al. |
| 2005/0209886 | A1 | 9/2005 | Corkern |
| 2005/0211468 | A1 | 9/2005 | Veeningen et al. |
| 2005/0228905 | A1 | 10/2005 | Veeningen et al. |
| 2005/0236184 | A1 | 10/2005 | Veeningen et al. |
| 2006/0197759 | A1 | 9/2006 | Fremming |
| 2007/0112547 | A1 | 5/2007 | Ghorayeb et al. |

FOREIGN PATENT DOCUMENTS

| | | |
|---|---|---|
| WO | WO-99/64896 A1 | 12/1999 |
| WO | WO-2004/049216 A1 | 6/2004 |
| WO | WO2005119289 | 12/2005 |

OTHER PUBLICATIONS

Rocky Mottahedeh, "Horizontal Well Geo-navigation: Planning, Monitoring and Geosteering," Canadian Int. Petroleum Conference, Paper 2005-017, Jun. 7, 2005.

PCT Notification of the International Search Report and Written Opinion issued Sep. 11, 2007, in related International Application No. PCT/US2007/00484 (14 pages).

Schlumberger Marketing Communications: "Interactive Teamwork for Collaborative Decisions"; SPE/IADC Drilling Conference, [Online] Feb. 21-23, 2006, pp. 1-8; XP002447901; Miami Beach, FL. (8 pages).

Rocky Mottahedeh: "Horizontal Well Geo-Navigation: Planning, Monitoring and Geosteering"; Canadian International Petroleum Conference [Online] Jun. 7-9, 2005; pp. 1-7; XP002447902; Calgary, Alberta, Canada. (8 pages).

Holt, J., et al.: "Mungo Field: Improved Communication Through 3D Visualization of Drilling Problems"; SPE Papers, No. 62523; 06/19-23, 2000; pp. 1-7; XP001010781; Long Beach, CA. (8 pages).

Preliminary Examination Report mailed on Jul. 31, 2012 for Taiwan Patent Application No. 096106630 (18 pages).

Official Action (examination report) mailed Oct. 24, 2011 for Mexican Patent Application No. MX/a/2008/010963 (9 pages).

Official Action (examination report) mailed Feb. 21, 2013 for Mexican Patent Application No. MX/a/2008/010963 (12 pages).

Examiner's Report dated Jun. 19, 2013 for Canadian Patent Application No. 2,643,834 (3 pages).

Office Action (substantive examination) mailed on Sep. 23, 2011 for Argentine Published Patent Application No. AR 059630 A1 (3 pages).

* cited by examiner

WELL PLANNING SYSTEM AND METHOD

CROSS REFERENCE TO RELATED APPLICATIONS

This application claims benefit of U.S. Provisional Application Ser. No. 60/777,143 entitled "Well Planning in Geological Context Using Embedded Risk Program," filed on Feb. 27, 2006, in the names of Jim Brady, Kris Givens, and Daan Veeningen.

Further, this application is related to (1) U.S. patent application Ser. No. 10/802,524, filed on Mar. 17, 2004, entitled "Method and apparatus and program storage device adapted for automatic qualitative and quantitative risk assessment based on technical wellbore design and earth properties"; (2) U.S. patent application Ser. No. 10/802,613, filed on Mar. 17, 2004, entitled "Method and apparatus and program storage device adapted for visualization of qualitative and quantitative risk assessment based on technical wellbore design and earth properties"; and (3) U.S. patent application Ser. No. 10/802,622 filed on Mar. 17, 2004, and entitled "Method and apparatus and program storage device including an integrated well planning workflow control system with process dependencies." For the purposes of this application, each of the aforementioned applications is hereby incorporated by reference.

BACKGROUND

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIG. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure and composition may be monitored. These parameters may be used to determine various characteristics of the subterranean formation.

Sensors may be positioned throughout the oilfield to collect data relating to various oilfield operations. For example, sensors in the wellbore may monitor fluid composition, sensors located along the flow path may monitor flow rates and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine when to drill new wells, re-complete existing wells, or alter wellbore production.

Data from one or more wellbores may be analyzed to plan or predict various outcomes at a given wellbore. In some cases, the data from neighboring wellbores, or wellbores with similar conditions or equipment is used to predict how a well will perform. There are usually a large number of variables and large quantities of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities as well as other portions of the oilfield operation. Examples of modeling techniques are shown in Patent/

Application/Publication Nos. U.S. Pat. No. 5,992,519, WO2004049216, WO 1999/064896, U.S. Pat. No. 6,313,837, US2003/0216897, US2003/0132934, US2005/0149307, and US2006/0197759. Typically, existing modeling techniques have been used to analyze only specific portions of the oilfield operation. More recently, attempts have been made to use more than one model in analyzing certain oilfield operations. See, for example, Patent/Application/Publication Nos. U.S. Pat. No. 6,980,940, WO04049216, US2004/0220846, and U.S. Ser. No. 10/586,283.

Techniques have also been developed to predict and/or plan certain oilfield operations, such as drilling operations. Examples of techniques for generating drilling plans are provided in Patent/Application/Publication Nos. US/2005/0236184, US/2005/0211468, US/2005/0228905, US/2005/0209886, and US/2005/0209836. Some drilling techniques involve controlling the drilling operation. Examples of such drilling techniques are shown in Patent/Application Nos. GB2392931 and GB2411669. Other drilling techniques seek to provide real-time drilling operations. Examples of techniques purporting to provide real time drilling are described in Patent/Application Nos. U.S. Pat. Nos. 7,079,952, 6,266,619, 5,899,958, 5,139,094, 7,003,439, and 5,680,906.

Oilfield data may also be used to minimize costs and risks associated with oilfield operations. Minimizing wellbore costs and associated risks requires wellbore construction planning techniques that account for the interdependencies involved in the wellbore design. The inherent difficulty is that most design processes and systems exist as independent tools used for individual tasks by the various disciplines involved in the planning process. In an environment where increasingly difficult wells of higher value are being drilled with fewer resources, there is now, more than ever, a need for a rapid well-planning, cost, and risk assessment tool.

Currently, software systems representing an automated process adapted for integrating both a wellbore construction planning workflow and accounting for process interdependencies exist. The automated process is based on a drilling simulator, the process representing a highly interactive process which is encompassed in a software system that: (1) allows well construction practices to be tightly linked to geological and geomechanical models, (2) enables asset teams to plan realistic well trajectories by automatically generating cost estimates with a risk assessment, thereby allowing quick screening and economic evaluation of prospects, (3) enables asset teams to quantify the value of additional information by providing insight into the business impact of project uncertainties, (4) reduces the time required for drilling engineers to assess risks and create probabilistic time and cost estimates faithful to an engineered well design, (5) permits drilling engineers to immediately assess the business impact and associated risks of applying new technologies, new procedures, or different approaches to a well design. Discussion of these points shows the application of the workflow and verifies the value, speed, and accuracy of this integrated well planning and decision-support tool.

Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk. Most people are not equipped to do this and those that do are very inconsistent unless strict process and checklists are followed. Some drilling risk software systems are in existence today, but the same human process in required to identify and assess the likelihood of each individual risk and the consequences. Those systems are simply a computer system for manually recording the results of the risk identification process.

Conventional software systems for automatic well planning may include a risk assessment component. This component automatically assesses risks associated with the technical well design decisions in relation to the earth's geology and geomechanical properties and in relation to the mechanical limitations of the equipment specified or recommended for use.

When users have identified and captured drilling risks for drilling a given well, no prescribed standard visualization techniques exist to add value to the risk information already created. Some techniques exist for locating an individual risk event at a specified measured depth or depth interval by using some type of symbol or shape and pattern combination in a three-dimensional (3D) space.

SUMMARY

In general, in one aspect, the invention relates to a method for performing oilfield operations for an oilfield having a subterranean formation with an underground reservoir therein, the oilfield being provided with at least one wellsite with oilfield equipment for extracting fluid from the underground reservoir, comprising collecting data comprising trajectory and earth properties associated with a planned well for a geoscience application to obtain a geoscience model, invoking a well planning system integrated with the geoscience application, extracting the trajectory and earth properties from the geoscience model to obtain an extracted trajectory and extracted earth properties, determining at least one parameter for the planned well based on the extracted trajectory and the extracted earth properties, and displaying the at least one parameter associated with the planned well within a geological context of the geoscience application to allow refinement of the planned well for efficient fluid extraction from the underground reservoir.

In general, in one aspect, the invention relates to a graphical user interface (GUI) associated with a geoscience application for performing oilfield operations for an oilfield having a subterranean formation with an underground reservoir therein, the oilfield being provided with at least one wellsite with oilfield equipment for extracting fluid from the underground reservoir, wherein the GUI comprises a task manager configured to display a plurality of risk assessment tasks for selection, wherein each of said plurality of risk assessment tasks is associated with a trajectory and earth properties used to calculate risk information, and a toolbar configured to display a well planning system for selection, wherein the well planning system is integrated with said geoscience application upon selection, wherein the GUI is configured to display the at least one parameter associated with the planned well within a geological context of the geoscience application to allow refinement of the planned well for efficient fluid extraction from the underground reservoir.

In general, in one aspect, the invention relates to a well planning system for performing oilfield operations for an oilfield having a subterranean formation with an underground reservoir therein, the oilfield being provided with at least one wellsite with oilfield equipment for extracting fluid from the underground reservoir, comprising an input apparatus configured to extract a trajectory and earth properties associated with the trajectory from a geoscience model in a geoscience application, wherein the trajectory and earth properties are associated with a planned well, a calculation apparatus configured to compute a well bore geometry, drilling parameters, and at least one parameter associated with the planned well using the trajectory and the earth properties, and a display apparatus configured to display the at least one parameter associated with the planned well within a geological context of the geoscience application to allow refinement of the planned well for efficient fluid extraction from the underground reservoir, wherein the well planning is integrated with the geoscience application.

In general, in one aspect, the invention relates to a computer usable medium for performing oilfield operations for an oilfield having a subterranean formation with an underground reservoir therein, the oilfield being provided with at least one wellsite with oilfield equipment for extracting fluid from the underground reservoir, wherein the computer usable medium comprises computer readable program code embodied therein for causing a computer system to collect data comprising trajectory and earth properties associated with a planned well for a geoscience application to obtain a geological model, invoke a well planning system integrated with the geoscience application, extract the trajectory and earth properties from the geoscience model to obtain an extracted trajectory and extracted earth properties, determine at least one parameter for the planned well based on the extracted trajectory and the extracted earth properties, and display the at least one parameter associated with the planned well within a geological context of the geoscience application to allow refinement of the planned well for efficient fluid extraction from the underground reservoir.

In general, in one aspect, the invention relates to a method for conceptual well planning, comprising invoking a risk plugin, wherein said risk plugin is integrated with a geological application, inputting parameters associated with a drilling well into said geological application, performing a plurality of risk calculations using said parameters, and displaying a time, a cost, and risk information associated with said drilling well within a geological context of said geological application.

In general, in one aspect, the invention relates to a graphical user interface (GUI) associated with a geological application for conceptual well planning, comprising a task manager configured to display a plurality of risk assessment tasks for selection, wherein each of said plurality of risk assessment tasks is associated with input data used to calculate risk information, and a toolbar configured to display a risk plugin for selection, wherein said selected risk plugin is integrated with said geological application, wherein the GUI is configured to display a time, a cost, and said risk information within a geological context of said geological application as calculated by said selected risk plugin using a selected risk assessment task of said plurality of risk assessment tasks and input data associated with the selected risk assessment task of said plurality of risk assessment tasks.

In general, in one aspect, the invention relates to a system for conceptual well planning, comprising an input apparatus configured to receive a plurality of input data associated with a drilling well, said input data including a plurality of input data calculation results, a calculation apparatus configured to compare each calculation result of said plurality of input data calculation results with each logical expression of a plurality of logical expressions, ranking, by said logical expression, said calculation result, and generating a plurality of ranked risk values in response thereto, each of said plurality of ranked risk values representing an input data calculation result ranked by said logical expression as either a high risk or a medium risk or a low risk, a risk apparatus configured to generate a time, a cost, and risk information in response to said plurality of ranked risk values, wherein said risk apparatus is integrated in a geological application, and a display apparatus adapted for displaying said time, said cost, and said risk information within a geological context of said geological application.

In general, in one aspect, the invention relates to a computer usable medium comprising computer readable program code embodied therein for causing a computer system to invoke a risk plugin, wherein said risk plugin is integrated with a geological application, input parameters associated with a drilling well into said geological application, perform a plurality of risk calculations using said parameters, and display a time, a cost, and risk information associated with said drilling well within a geological context of said geological application.

Other aspects of the invention will be apparent from the following description and the appended claims.

BRIEF DESCRIPTION OF DRAWINGS

The present application contains at least one drawing executed in color. Copies of this patent application publication with color drawings will be provided by the Office upon request and payment of the necessary fee.

DETAILED DESCRIPTION

Figure 1A:
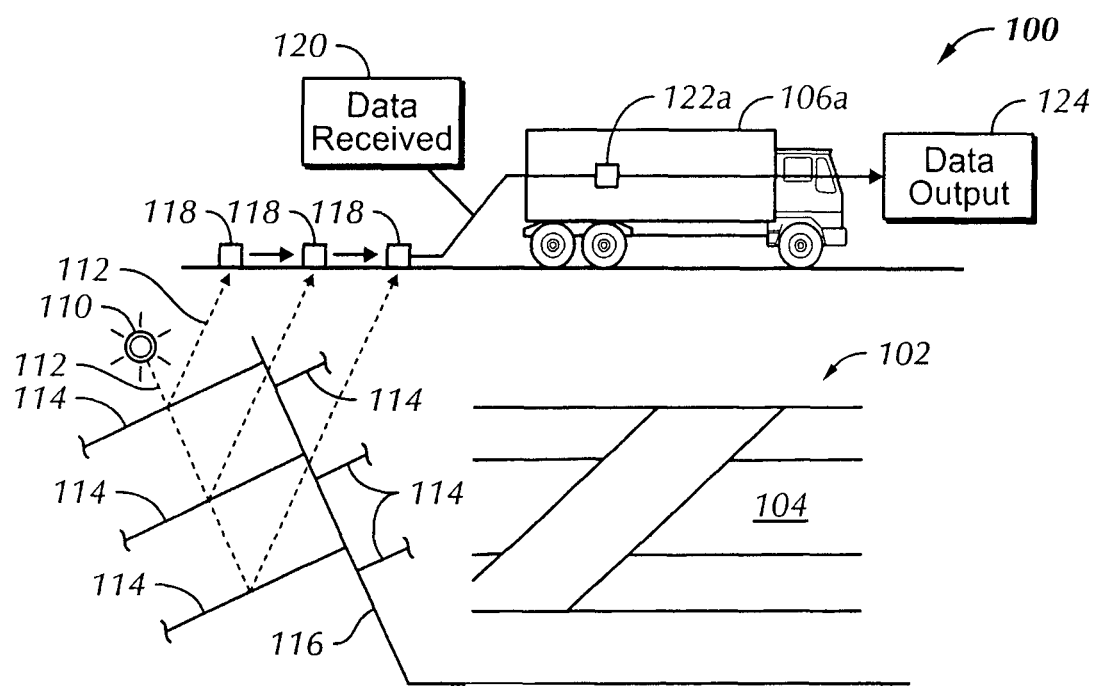
FIGS. 1A-1D depict a schematic view of an oilfield having subterranean structures containing reservoirs therein, various oilfield operations being performed on the oilfield.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the present invention relate to the integration of geoscience modeling software and the Well Planning System (WPS) to model and display well bore geometry, drilling parameters, risk quantification, and the time and cost to drill a well in a geological context.

The present invention involves applications generated for the oil and gas industry. FIGS. 1A-1D illustrate an exemplary oilfield (100) with subterranean structures and geological structures therein. More specifically, FIGS. 1A-1D depict schematic views of an oilfield (100) having subterranean structures (102) containing a reservoir (104) therein and depicting various oilfield operations being preformed on the oilfield. Various measurements of the subterranean formation are taken by different tools at the same location. These measurements may be used to generate information about the formation and/or the geological structures and/or fluids contained therein.

FIG. 1A depicts a survey operation being preformed by a seismic truck (106a) to measure properties of the subterranean formation. The survey operation is a seismic survey operation for producing sound vibrations. In FIG. 1A, an acoustic source (110) produces sound vibrations (112) that reflects off a plurality of horizons (114) in an earth formation 116. The sound vibration(s) (112) is (are) received in by sensors, such as geophone-receivers (118), situated on the earth's surface, and the geophones (118) produce electrical output signals, referred to as data received (120) in FIG. 1.

The received sound vibration(s) (112) are representative of different parameters (such as amplitude and/or frequency). The data received (120) is provided as input data to a computer (122a) of the seismic recording truck (106a), and responsive to the input data, the recording truck computer (122a) generates a seismic data output record (124). The seismic data may be further processed as desired, for example by data reduction.

Figure 1B:
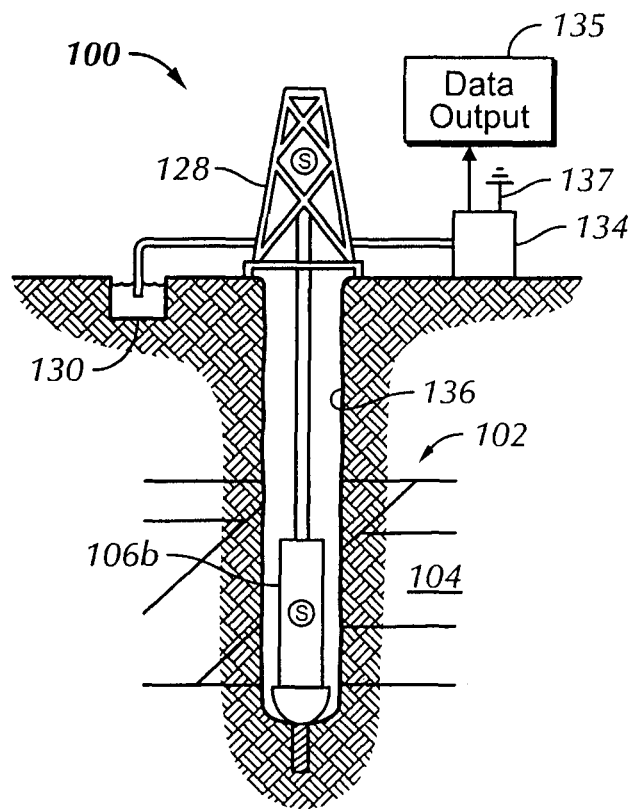

FIG. 1B depicts a drilling operation being performed by a drilling tool 106b suspended by a rig (128) and advanced into the subterranean formation (102) to form a wellbore (136). A mud pit (130) is used to draw drilling mud into the drilling tool via flow line (132) for circulating drilling mud through the drilling tool and back to the surface. The drilling tool is advanced into the formation to reach reservoir (104). The drilling tool is preferably adapted for measuring downhole properties. The logging while drilling tool may also be adapted for taking a core sample (133) as shown, or removed so that a core sample may be taken using another tool.

A surface unit (134) is used to communicate with the drilling tool and offsite operations. The surface unit is capable of communicating with the drilling tool to send commands to drive the drilling tool, and to receive data therefrom. The surface unit is preferably provided with computer facilities for receiving, storing, processing and analyzing data from the oilfield. The surface unit collects data output (135) generated during the drilling operation. Computer facilities, such as those of the surface unit, may be positioned at various locations about the oilfield and/or at remote locations.

Sensors (S), such as gauges, may be positioned throughout the reservoir, rig, oilfield equipment (such as the downhole tool) or other portions of the oilfield for gathering information about various parameters, such as surface parameters, downhole parameters and/or operating conditions. These sensors preferably measure oilfield parameters, such as weight on bit, torque on bit, pressures, temperatures, flow rates, compositions, measured depth, azimuth, inclination and other parameters of the oilfield operation.

The information gathered by the sensors may be collected by the surface unit and/or other data collection sources for analysis or other processing. The data collected by the sensors may be used alone or in combination with other data. The data may be collected in a database and all or select portions of the data may be selectively used for analyzing and/or predicting oilfield operations of the current and/or other wellbores.

Data outputs from the various sensors positioned about the oilfield may be processed for use. The data may be may be historical data, real time data or combinations thereof The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical and/or reservoir engineering simulations. The reservoir, wellbore, surface and/or process data may be used to perform reservoir, wellbore, or other production simulations. The data outputs from the oilfield operation may be generated directly from the sensors, or after some preprocessing or modeling. These data outputs may act as inputs for further analysis.

The data is collected and stored at the surface unit (134). One or more surface units may be located at the oilfield, or linked remotely thereto. The surface unit may be a single unit, or a complex network of units used to perform the necessary data management functions throughout the oilfield. The surface unit may be a manual or automatic system. The surface unit may be operated and/or adjusted by a user.

The surface unit may be provided with a transceiver (137) to allow communications between the surface unit and various portions of the oilfield and/or other locations. The surface unit may also be provided with or functionally linked to a controller for actuating mechanisms at the oilfield. The surface unit may then send command signals to the oilfield in response to data received. The surface unit may receive commands via the transceiver or may itself execute commands to the controller. A processor may be provided to analyze the data (locally or remotely) and make the decisions to actuate the controller. In this manner, the oilfield may be selectively adjusted based on the data collected. These adjustments may be made automatically based on computer protocol, or manually by an operator. In some cases, well plans and/or well placement may be adjusted to select optimum operating conditions, or to avoid problems.

Figure 1C:
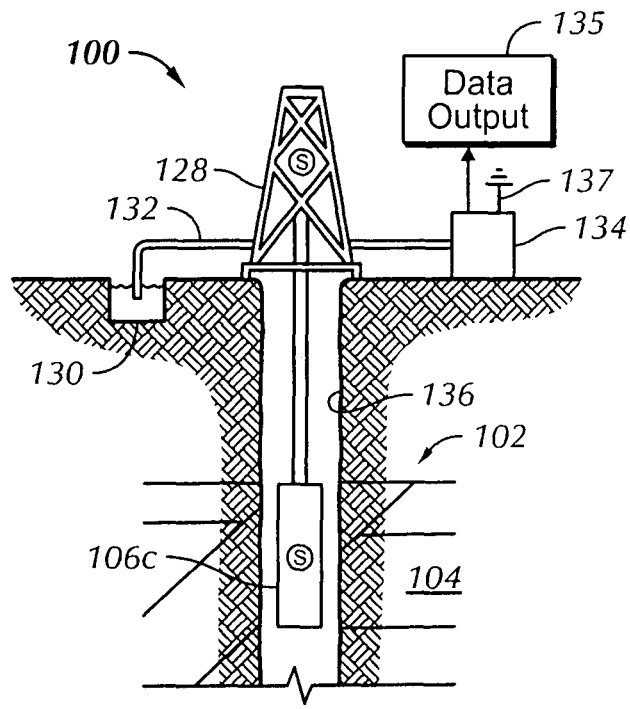

FIG. 1C depicts a wireline operation being performed by a wireline tool (106c) suspended by the rig (128) and into the wellbore (136) of FIG. 1B. The wireline tool is preferably adapted for deployment into a wellbore for performing well logs, performing downhole tests and/or collecting samples. The wireline tool may be used to provide another method and apparatus for performing a seismic survey operation. The wireline tool of FIG. 1C may have an explosive or acoustic energy source (144) that provides electrical signals to the surrounding subterranean formations (102).

The wireline tool may be operatively linked to, for example, the geophones (118) stored in the computer (122a) of the seismic recording truck (106a) of FIG. 1A. The wireline tool may also provide data to the surface unit (134). As shown data output (135) is generated by the wireline tool and collected at the surface. The wireline tool may be positioned at various depths in the wellbore to provide a survey of the subterranean formation.

Figure 1D:
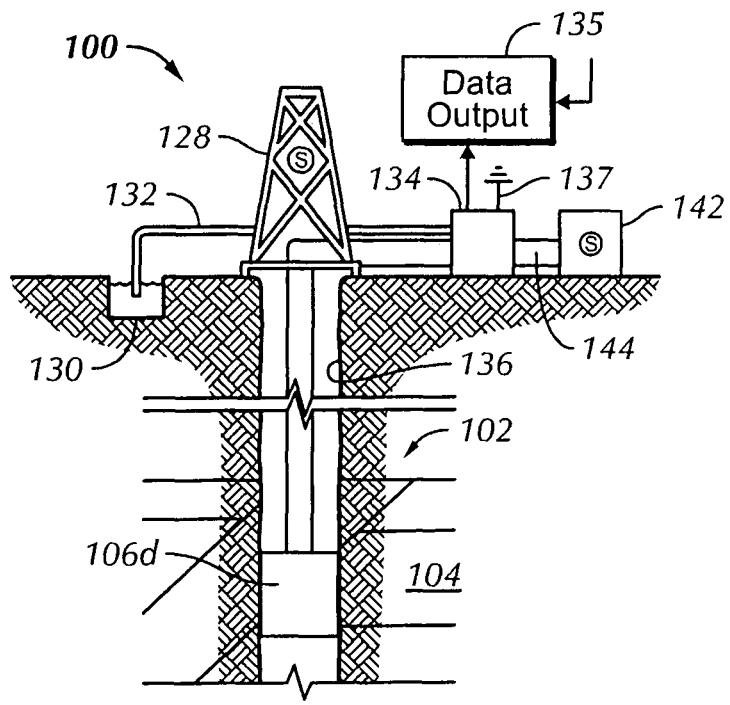

FIG. 1D depicts a production operation being performed by a production tool (106d) deployed from the rig (128) and into the completed wellbore (136) of FIG. 1C for drawing fluid from the downhole reservoirs into surface facilities (142). Fluid flows from reservoir (104) through wellbore (136) and to the surface facilities (142) via a gathering network (144). Sensors (S) positioned about the oilfield are operatively connected to a surface unit (142) for collecting data therefrom. During the production process, data output (135) may be collected from various sensors and passed to the surface unit and/or processing facilities. This data may be, for example, reservoir data, wellbore data, surface data and/or process data.

While only one wellsite is shown, it will be appreciated that the oilfield may cover a portion of land that hosts one or more wellsites. One or more gathering facilities may be operatively connected to one or more of the wellsites for selectively collecting downhole fluids from the wellsite(s).

Throughout the oilfield operations depicted in FIGS. 1A-D, there are numerous business considerations. For example, the equipment used in each of these figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIG. 1 depicts monitoring tools used to measure properties of an oilfield, it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors S may be located at various positions along the subterranean formation and/or the monitoring tools to collect and/or monitor the desired data. Other sources of data may also be provided from offsite locations.

The oilfield configuration of FIG. 1 is not intended to limit the scope of the invention. Part, or all, of the oilfield may be on land and/or sea. Also, while a single oilfield measured at a single location is depicted, the present invention may be utilized with any combination of one or more oilfields, one or more processing facilities and one or more wellsites.

Figure 2A:
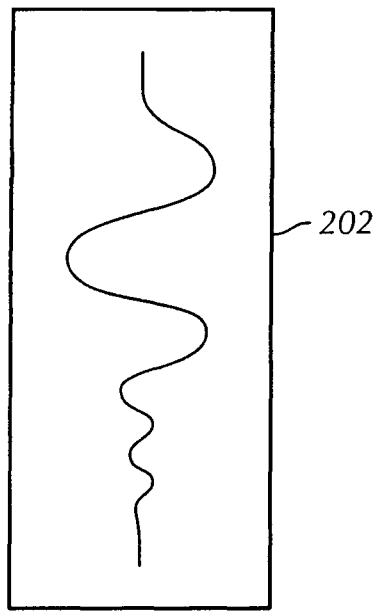
FIGS. 2A-2D are graphical depictions of data collected by the tools of FIGS. 1A-D, respectively.
Figure 2B:
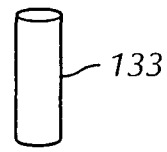
Figure 2C:
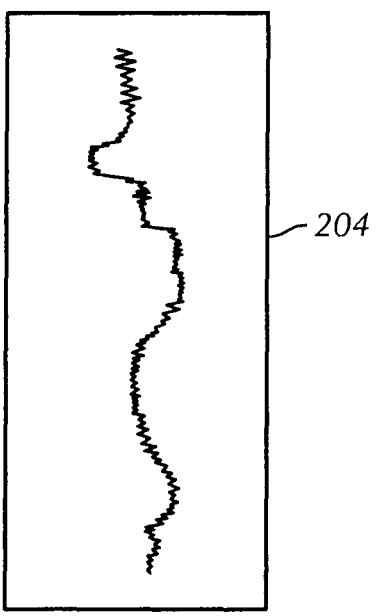
Figure 2D:
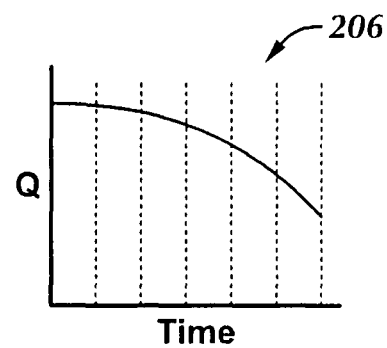

FIGS. 2A-D are graphical depictions of data collected by the tools of FIGS. 1A-D, respectively. FIG. 2A depicts a seismic trace (202) of the subterranean formation of FIG. 1A taken by survey tool (106a). The seismic trace measures the two-way response over a period of time. FIG. 2B depicts a core sample (133) taken by the logging tool (106b). The core test typically provides a graph of the density, resistivity or other physical property of the core sample over the length of the core. FIG. 2C depicts a well log (204) of the subterranean formation of FIG. 1C taken by the wireline tool (106c). The wireline log typically provides a resistivity measurement of the formation at various depts. FIG. 2D depicts a production decline curve (206) of fluid flowing through the subterranean formation of FIG. 1D taken by the production tool (106d). The production decline curve typically provides the production rate (Q) as a function of time (t).

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may need adjustment.

Figure 3:
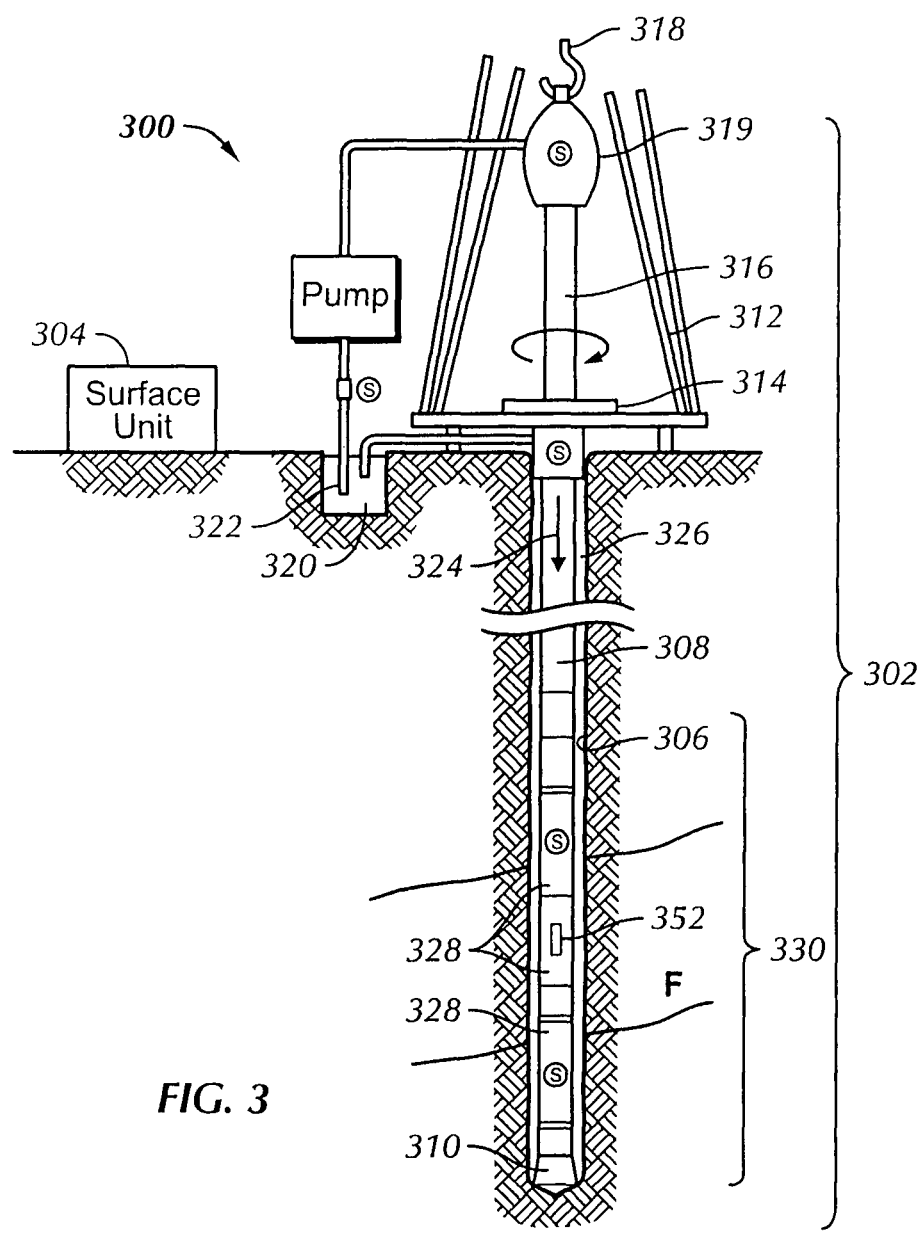
FIG. 3 is a schematic view, partially in cross-section of a drilling operation of an oilfield.

FIG. 3 is a schematic view of a wellsite (300) depicting a drilling operation, such as the drilling operation of FIG. 1B, of an oilfield in detail. The wellsite system (300) includes a drilling system (302) and a surface unit (304). In the illustrated embodiment, a borehole (306) is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

The drilling system (302) includes a drill string (308) suspended within the borehole (306) with a drill bit (310) at its lower end. The drilling system (302) also includes the land-based platform and derrick assembly (312) positioned over the borehole (306) penetrating a subsurface formation (F). The assembly (312) includes a rotary table (314), kelly (316), hook (318) and rotary swivel (319). The drill string (308) is rotated by the rotary table (314), energized by means not shown, which engages the kelly (316) at the upper end of the drill string. The drill string (308) is suspended from hook (318), attached to a traveling block (also not shown), through the kelly (316) and a rotary swivel (319) which permits rotation of the drill string relative to the hook.

The surface system further includes drilling fluid or mud (320) stored in a pit (322) formed at the well site. A pump (324) delivers the drilling fluid (320) to the interior of the drill string (308) via a port in the swivel (319), inducing the drilling fluid to flow downwardly through the drill string (308) as indicated by the directional arrow (324). The drilling fluid exits the drill string (308) via ports in the drill bit (310), and then circulates upwardly through the region between the outside of the drill string and the wall of the borehole, called the annulus (326). In this manner, the drilling fluid lubricates the drill bit (310) and carries formation cuttings up to the surface as it is returned to the pit (322) for recirculation.

The drill string (308) further includes a bottom hole assembly (BHA), generally referred to as (330), near the drill bit (310) (in other words, within several drill collar lengths from the drill bit). The bottom hole assembly (330) includes capabilities for measuring, processing, and storing information, as well as communicating with the surface unit. The BHA (330) further includes drill collars (328) for performing various other measurement functions.

Sensors (S) are located about the wellsite to collect data, preferably in real time, concerning the operation of the wellsite, as well as conditions at the wellsite. The sensors (S) of FIG. 3 may be the same as the sensors of FIGS. 1A-D. The sensors of FIG. 3 may also have features or capabilities, of monitors, such as cameras (not shown), to provide pictures of the operation. Surface sensors or gauges S may be deployed about the surface systems to provide information about the surface unit, such as standpipe pressure, hookload, depth, surface torque, rotary rpm, among others. Downhole sensors or gauges (S) are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the various parts of the drilling system and/or the surface control unit.

The drilling system (302) is operatively connected to the surface unit (304) for communication therewith. The BHA (330) is provided with a communication subassembly (352) that communicates with the surface unit. The communication subassembly (352) is adapted to send signals to and receive signals from the surface using mud pulse telemetry. The communication subassembly may include, for example, a transmitter that generates a signal, such as an acoustic or electromagnetic signal, which is representative of the measured drilling parameters. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

As described above, the present invention is directed toward the integration of a geoscience modeling software and the WPS to model and display well bore geometry, drilling parameters, and at least one parameter associated with drilling a well. Parameters associated with drilling a well may be risk quantification, the time, and the cost to drill a well in a geological context. Those skilled in the art will appreciate that some or all of the aforementioned parameters may be displayed. The WPS is a "smart" tool for rapid creation of a detailed drilling operational plan that provides economics and risk analysis. The WPS may be a software system or an automated software system. Those skilled in the art will appreciate that the WPS may also be referred to as a risk plug-in that integrates with the geoscience modeling software to assess the risk, time, and cost associated with drilling a well.

Specifically, the user (e.g., an earth scientist, a geologist, a geophysicist, and/or other trained specialists) creates a geoscience model that models geomechanical earth properties associated with drilling wells. The user inputs one or more trajectories that represent the drilling path of one or more drilling wells, and the WPS uses this data and various catalogs to automatically calculate and deliver an optimum well design thereby generating a plurality of outputs, such as drill string design, casing seats, mud weights, bit selection and use, hydraulics, and the other essential factors for the drilling task (described below in FIG. 4). The WPS requires the loading of either geomechanical earth properties extracted from an earth model, or, at a minimum, pore pressure, fracture gradient, and unconfined compressive strength. Those skilled in the art will appreciate that the geomechanical earth properties may be extracted from a populated mechanical earth model, from interpreted logs applied to this trajectory, or manually entered. Further, those skilled in the art will appreciate that the trajectory and earth model may be represented/input in three-dimensions (3D). From this input data, the WPS automatically selects the most appropriate rig and associated properties, costs, and mechanical capabilities. The rig properties include parameters like derrick rating to evaluate risks when running heavy casing strings, pump characteristics for the hydraulics, size of the BOP, which influences the sizes of the casings, and very importantly the daily rig rate and spread rate. The user can select a different rig than what the WPS proposed and can modify any of the technical specifications suggested by the software.

The WPS has two primary user groups: (1) a geoscientist whom works with trajectory and earth properties data; and (2) a drilling engineer whom works with wellbore geometry and drilling parameter outputs to achieve optimum activity plan and risk assessment. The WPS provides the necessary drilling engineering calculations, which allows the user to scope drilling candidates rapidly in terms of time, costs, and risks Geoscientists typically provide the trajectory and earth properties data. The scenario, which consists of the entire process and its output, can be exported for sharing with other users for peer review or as a communication tool to facilitate project management between office and field. Variations on a scenario can be created for use in business decisions. The WPS can also be used as a training tool for geoscientists and drilling engineers.

The WPS of the present invention includes a plurality of tasks. The plurality of tasks is divided into four groups: (1) Input task, where input data is provided, (2) Wellbore Geometry task, (3) Drilling Parameters task, where calculations are preformed, and (4) a Results task, where a set of results are calculated and presented to a user. The Input task includes the following components: (1) scenario information, (2) trajectory, (3) Earth properties, (4) Rig selection, and (5) Resample Data. The Wellbore Geometry task includes the following components: (1) Wellbore stability, (2) Mud weights and casing points, (3) Wellbore sizes, (4) Casing design, (5) Cement design, and (6) Wellbore geometry. The Drilling Parameters task includes the following components: (1) Drilling fluids, (2) Bit selection, (3) Drillstring design, (4) Hydraulics. The Results task includes the following components: (1) Risk Assessment, (2) Risk Matrix, (3) Time and cost data, (4) Time and cost chart, (5) Monte Carlo, (6) Monte Carlo graph, (7) Summary report, and (8) montage. System tasks are arranged in a single workflow in which the output of one task is included as input to the next. The user can modify most outputs, which permits fine-tuning of the input values for the next task.

Figure 4:
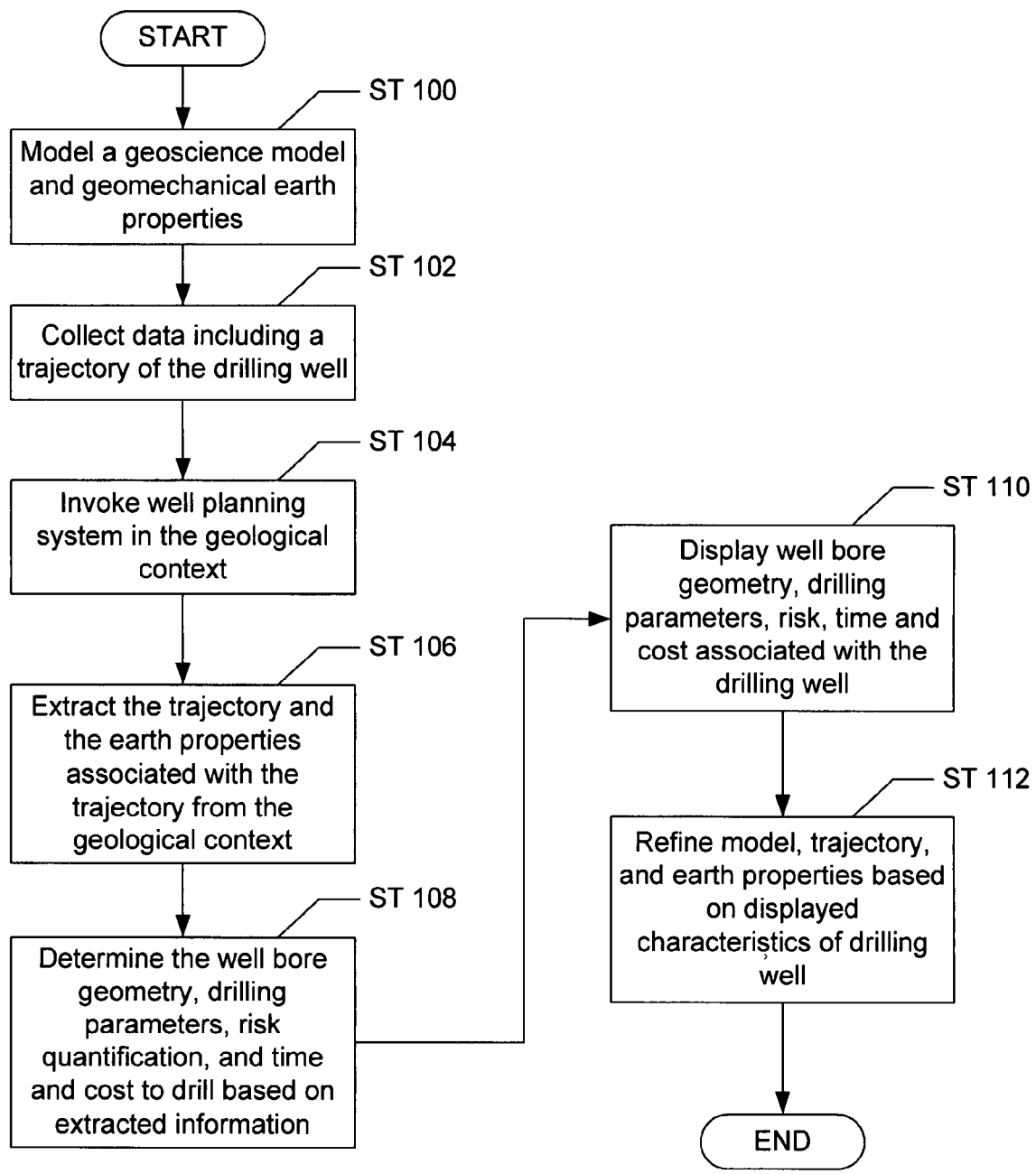
FIG. 4 shows a flow chart for using a well planning system (WPS) integrated with a geoscience application.

In the present invention, the WPS is integrated with a geoscience application and so that the WPS can display the time, cost, and risk associated with a planned well in a geological context. The geoscience application may be a 3D earth modeling application. The planned well may also be referred to as a conceptually planned drilling well. Those skilled in the art will appreciate that the geoscience application may be a geological application, a geophysical application, an oilfield service application, an earth science application, an application for subterranean visualization, or a combination of the aforementioned types of applications. FIG. 4 shows a flow chart for using the integrated geoscience application and the WPS to display the time, cost, and risk associated with a planned well. Initially, the geoscience application creates a geoscience model that represents a geological marker (i.e., the surface of the planned well) and geomechanical earth properties associated with the geological marker (Step 100). Subsequently, data including a trajectory associated with the planned well is collected and input into the model created in Step 100 (Step 102). Those skilled in the art will appreciate that data associated with more than one trajectory may be collected and input into the model. Further, both the trajectory and the model may be represented in 3D. Upon inputting the trajectory, the model extracts the geomechanical earth properties along the trajectory (not shown).

At this stage, the WPS is invoked within the geological context of the geoscience application (Step 104). The WPS is configured to extract the trajectory and the geomechanical earth properties associated with the trajectory from the model (Step 106). Thus, two extractions of the trajectory and earth properties associated with the trajectories occur: (i) the model created in Step 100 extracts the trajectory and earth properties associated with the trajectory, and (ii) the WPS subsequently extracts the same information from the model. Those skilled in the art will appreciate that the WPS may extract the trajectory and the earth properties associated with the trajectory directly from the geoscience model. Alternatively, the model may provide the trajectory and earth properties to the WPS.

Continuing with FIG. 4, once the WPS obtains the trajectory and relevant geomechanical earth properties, the WPS uses this data to automatically determine the well bore geometry, drilling parameters, and parameters such as the risk, the time, and the cost associated with the planned well (Step 108). Subsequently, the computed well bore geometry, drilling parameters, and parameters that may include risk, time and cost associated with the planned well are displayed so that users can visualize the computed characteristics of the planned well (Step 110). More particularly, the well bore geometry, drilling parameters, risk quantification, and the probabilistic distribution of the time and cost to drill the planned well are computed by the WPS. The computed and displayed data is written back to the geoscience model for later use. In the final step, users can use the computed characteristics to refine the model, trajectory, and earth properties (Step 112). That is, based on the visualization of the planned well characteristics, users can perform sensitivity analysis, come up with alternate scenarios, etc., for improving the characteristics of the planned well. The WPS may ultimately be updated and re-run in a time-frame that supports operational decision making. The entire replanning process should be fast enough to allow users to rapidly iterate to refine well plans through a series of what-if scenarios.

Those skilled in the art will appreciate that the process of FIG. 4 may be repeated for each trajectory input into the geoscience model. That is, FIG. 4 represents a process that may be repeated for all relevant trajectories associated with the planned well. Further, those skilled in the art will appreciate that subsequent references to the WPS in the remainder of this disclosure refer to the WPS as described in FIG. 4.

Advantageously, planning a well within a geoscience context in the manner described in FIG. 4 saves time and money, provides an objective/unbiased visualization of the characteristics that are most important to geoscientists and others involved in the drilling process. Further, the process described in FIG. 4 allows for the probabilistic determination of the best risk optimal 3D trajectory in the context of a 3D earth model. That is, the geoscience model may be a 3D earth model. In addition, the manner in which the WPS computes parameters such as risk, time, and cost for the planned well is transparent for users. Thus, users can easily look into how the risk, time, and cost are computers to determine why the risk, time, or cost for a particular trajectory is high/low in particular areas. Further, the above described process may be used to plan multiple conceptual drilling wells by specifying multiple trajectories in a field at the same time.

In the WPS, a detailed operational activity plan is automatically assembled from customizable templates. To obtain the time to drill the planned well, the duration for each activity is calculated based on the engineered results of the previous tasks, and Non-Productive Time (NPT) can be included. NPT is time when operations are not planned, or due to operational difficulties, the progress of the well has be delayed, also often referred to as Trouble Time. The activity plan specifies a range (minimum, average, and maximum) of time and cost for each activity and lists the operations sequentially as a function of depth and hole section. This information is graphically presented in time vs. depth and cost vs. depth graphs, which are displayed within a geological context of the geoscience application. The system generates time vs. depth curve based on the activity planning details. Particularly, the system creates a best, mean, and worst set of time curves using combinations of default and historical data.

The WPS may use Monte Carlo simulation to reconcile all of the range of time and cost data to produce probabilistic time and cost distributions. Specifically, the WPS prompts a user to select probability points (such as P10, P50, P90) and then runs a Monte Carlo simulation to generate a probability distribution curve for the scenario, highlighting the user selected reference points and corresponding values of time. The WPS provides this data as frequency data or cumulative probability curves. The WPS generates a cost plan using default cost templates that are pre-configured by users and can be modified at this point. Many of the costs reference durations of the entire well, hole sections, or specific activities to calculate the applied cost.

As noted above, the WPS is configured to calculate risk assessments for a variety of risks associated with the planned well. Risks are calculated in four ways: (1) by "Individual Risk Parameters", (2) by "Risk Categories", (3) by "Total Risk", and (4) the calculation of "Qualitative Risk Indices."

In the WPS, drilling event "risks" are quantified in as many as 54 risk categories of which the user can customize the risk thresholds. The risk categories are plotted as a function of depth and are color coded to quickly aid a visual interpretation of potential trouble spots. Further, risk assessment is achieved by grouping the as many as 54 risk categories into the general categories that may include gains, losses, stuck pipe, and mechanical problems. The total risk log curve can be displayed along the trajectory to correlate drilling risks with geological markers and geomechanical earth properties (i.e., physical characteristics of the rock. Additional risk analysis views display the "actual risk" as a portion of the "potential risk" for each design task.

The Risk Assessment component associated with the WPS of the present invention may be a system that automatically assesses risks associated with the technical well design decisions in relation to the earth's geology and geomechanical properties and in relation to the mechanical limitations of the equipment specified or recommended for use. Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk.

Individual Risk Parameters may be calculated along the measured depth of the well and color coded into high, medium, or low risk for display to the user. Each risk identifies to the user: an explanation of exactly what is the risk violation, and the value and the task in the workflow controlling the risk. These risks are calculated consistently and transparently allowing users to see and understand all of the known risks and how they are identified. These risks also inform the user which aspects of the well justify further engineering effort to investigate in more detail.

Group/category risks may be calculated by incorporating all of the individual risks in specific combinations. Each individual risk is a member of one or more Risk Categories. Four principal Risk Categories are defined as follows: (1) Gains, (2) Losses, (3) Stuck Pipe, and (4) Mechanical. The aforementioned four Rick Categories are the most common and costly groups of troublesome events in drilling worldwide. The Total Risk for a scenario is calculated based on the cumulative results of all of the group/category risks along both the risk and depth axes.

Each individual risk parameter may use to produce an individual risk index which is a relative indicator of the likelihood that a particular risk will occur. This may be purely qualitative, but allows for comparison of the relative likelihood of one risk to another—this is especially indicative when looked at from a percentage change. Each risk category may be used to produce a category risk index also indicating the likelihood of occurrence and is useful for identifying the most likely types of trouble events to expect. Finally, a single risk index may be produced for the scenario that is specifically useful for comparing the relative risk of one scenario to another.

The WPS of the present invention may be capable of delivering a comprehensive technical risk assessment automatically. Lacking an integrated model of the technical well design to relate design decisions to associated risks, the WPS can attribute the risks to specific design decisions and it can direct users to the appropriate place to modify a design choice in efforts to modify the risk profile of the well.

The WPS may use Risk Assessment Algorithms and Risk Assessment Logical Expressions to calculate various risks associated with the planned well. Values of the Input Data that are used as input for the Risk Assessment Algorithms and the Risk Assessment Logical Expressions include the following:

(1) Casing Point Depth
(2) Measured Depth
(3) True Vertical Depth
(4) Mud Weight
(5) Measured Depth
(6) ROP
(7) Pore Pressure
(8) Static Temperature
(9) Pump Rate
(10) Dog Leg Severity
(11) ECD
(12) Inclination
(13) Hole Size
(14) Casing Size
(15) Easting-westing
(16) Northing-Southing
(17) Water Depth
(18) Maximum Water Depth
(19) Maximum well Depth
(20) Kick Tolerance
(21) Drill Collar 1 Weight
(22) Drill Collar 2 Weight
(23) Drill Pipe Weight
(24) Heavy Weight Weight
(25) Drill Pipe Tensile Rating
(26) Upper Wellbore Stability Limit
(27) Lower Wellbore Stability Limit
(28) Unconfined Compressive Strength
(29) Bit Size
(30) Mechanical drilling energy (UCS integrated over distance drilled by the bit)
(31) Ratio of footage drilled compared to statistical footage
(32) Cumulative UCS
(33) Cumulative Excess UCS
(34) Cumulative UCS Ratio
(35) Average UCS of rock in section
(36) Bit Average UCS of rock in section
(37) Statistical Bit Hours
(38) Statistical Drilled Footage for the bit
(39) RPM
(40) On Bottom Hours
(41) Calculated Total Bit Revolutions
(42) Time to Trip
(43) Critical Flow Rate
(44) Maximum Flow Rate in hole section
(45) Minimum Flow Rate in hole section
(46) Flow Rate
(47) Total Nozzle Flow Area of bit
(48) Top Of Cement
(49) Top of Tail slurry
(50) Length of Lead slurry
(51) Length of Tail slurry
(52) Cement Density Of Lead
(53) Cement Density Of Tail slurry
(54) Casing Weight per foot
(55) Casing Burst Pressure
(56) Casing Collapse Pressure
(57) Casing Type Name
(58) Hydrostatic Pressure of Cement column
(59) Start Depth
(60) End Depth
(61) Conductor
(62) Hole Section Begin Depth
(63) Openhole Or Cased hole completion
(64) Casing Internal Diameter
(65) Casing Outer Diameter
(66) Mud Type
(67) Pore Pressure without Safety Margin
(68) Tubular Burst Design Factor
(69) Casing Collapse Pressure Design Factor
(70) Tubular Tension Design Factor
(71) Derrick Load Rating
(72) Drawworks Rating
(73) Motion Compensator Rating
(74) Tubular Tension rating
(75) Statistical Bit ROP
(76) Statistical Bit RPM
(77) Well Type
(78) Maximum Pressure
(79) Maximum Liner Pressure Rating
(80) Circulating Pressure
(81) Maximum UCS of bit
(82) Air Gap
(83) Casing Point Depth
(84) Presence of H2S
(85) Presence of CO2
(86) Offshore Well
(87) Flow Rate Maximum Limit Risk Assessment Constants Values of the Risk Assessment Constants that are used as input data for Risk Assessment Algorithms and the Risk Assessment Logical Expressions include the following:

(1) Maximum Mud Weight Overbalance to Pore Pressure
(2) Minimum Required Collapse Design Factor
(3) Minimum Required Tension Design Factor
(4) Minimum Required Burst Design Factor
(5) Rock density
(6) Seawater density Risk Assessment Catalogs Values of the Risk Assessment Catalogs that are used as input data for Risk Assessment Algorithms and the Risk Assessment Logical Expressions include the following:
(1) Risk Matrix Catalog
(2) Risk Calculation Catalog
(3) Drillstring component catalog
(4) Drill Bit Catalog
(5) Clearance Factor Catalog
(6) Drill Collar Catalog
(7) Drill Pipes Catalog
(8) Minimum and maximum flow rate catalog
(9) Pump catalog
(10) Rig Catalog
(11) Constants and variables Settings catalog
(12) Tubular Catalog Risk Assessment Output Data The following paragraphs will set forth the Risk Assessment Output Data, which is generated by the Risk Assessment Algorithms. The "Risk Assessment Output Data" includes the following types of output data: (1) Risk Categories, (2) Subcategory Risks, and (3) Individual Risks. The "Risk Categories", "Subcategory Risks", and "Individual Risks" included within the "Risk Assessment Output Data" include the following:

The following "Risk Categories" may be included in the calculation:
(1) Individual Risk
(2) Average Individual Risk
(3) Subcategory Risk
(4) Average Subcategory Risk
(5) Total risk
(6) Average total risk
(7) Potential risk for each design task
(8) Actual risk for each design task The following "Subcategory Risks" may be included in the calculation:
(1) Gains risks
(2) Losses risks
(3) Stuck Pipe risks
(4) Mechanical risks The following set of formulas/equations detail how each risk calculation may be performed.

Risk Calculation #1—Individual Risk Calculation:

Referring to the Risk Assessment Output Data set forth above, there are as many as fifty-four (54) "Individual Risks" specified. For an "Individual Risk":
a High risk=90,
a Medium risk=70, and
a Low risk=10
High risk color code=Red
Medium risk color code=Yellow
Low risk color code=Green If the "Risk Assessment Logical Expressions" assign a "high risk" rank to a particular "Input Data calculation result", the "Risk Assessment Algorithms" subsequently assign a value "90" to that "Input Data calculation result" and a color "red" to that "Input Data calculation result". If the "Risk Assessment Logical Expressions" assign a "medium risk" rank to a particular "Input Data calculation result", the "Risk Assessment Algorithms" subsequently assign a value "70" to that "Input Data calculation result" and a color "yellow" to that "Input Data calculation result". If the "Risk Assessment Logical Expressions" assign a "low risk" rank to a particular "Input Data calculation result", the "Risk Assessment Algorithms" subsequently assign a value "10" to that "Input Data calculation result" and a color "green" to that "Input Data calculation result".

Therefore, in response to the "Ranked Individual Risks" from the Logical Expressions, the Risk Assessment Algorithms assigns to each of the "Ranked Individual Risks" a value of 90 and a color "red" for a high risk, a value of 70 and a color "yellow" for the medium risk, and a value of 10 and a color "green" for the low risk. However, in addition, in response to the "Ranked Individual Risks" from the Logical Expressions, the Risk Assessment Algorithms also generate a plurality of ranked "Risk Categories" and a plurality of ranked "Subcategory Risks"

The "Risk Assessment Output Data" may include: (1) eight "Risk categories", (2) four "Subcategory Risks", and (3) fifty-four (54) "Individual Risks" [that is, 54 individual risks plus 2 "gains" plus 2 "losses" plus 2 "stuck" plus 2 "mechanical" plus 1 "total"=63 risks].

Risk Calculation #2—Average Individual Risk:

The average of all of the "Risk Values" may be calculated as follows:

$$\text{Average individual risk} = \frac{\sum_{i}^{n} Riskvalue_i}{n}$$

In order to determine the "Average Individual Risk", sum the above referenced "Risk Values" and then divide by the number of such "Risk Values", where i=number of sample points. The value for the "Average Individual Risk" is displayed at the bottom of the colored individual risk track.

Risk calculation #3—Risk Subcategory

Referring to the "Risk Assessment Output Data" set forth above, the following "Subcategory Risks" are defined: (a) gains, (b) losses, (c) stuck and (d) mechanical, where a "Subcategory Risk" (or "Risk Subcategory") may be defined as follows:

$$\text{Risk Subcategory} = \frac{\sum_{j}^{n} (Riskvalue_j \times severity_j \times N_j)}{\sum_{j} (severity_j \times N_j)}$$

j=number of individual risks,
0≤Severity≤5, and
$N_j$=either 1 or 0 depending on whether the Risk Value$_j$ contributes to the sub category Severity j=from the risk matrix catalog.

Red risk display for Risk Subcategory≥40

Yellow risk display for 20≤Risk Subcategory<40

Green risk display for Risk Subcategory<20

Risk Calculation #4—Average Subcategory Risk:

$$\text{Average subcategory risk} = \frac{\sum_{i}^{n}(\text{Risk Subcategory}_i \times \text{risk multiplier}_i)}{\sum_{1}^{n}\text{risk multiplier}_i}$$

n=number of sample points.
The value for the average subcategory risk is displayed at the bottom of the colored subcategory risk track.
Risk Multiplier=3 for Risk Subcategory≥40,
Risk Multiplier=2 for 20≤Risk Subcategory<40
Risk Multiplier=1 for Risk Subcategory<20
Risk Calculation #5—Total Risk
The total risk calculation may be based on the following categories: (a) gains, (b) losses, (c) stuck, and (d) mechanical.

$$\text{Risk Total} = \frac{\sum_{1}^{4}\text{Risk subcategory}_k}{4}$$

where $k$ = number of subcategories

Red risk display for Risk total>40
Yellow risk display for 20≤Risk Total<40
Green risk display for Risk Total<20
Risk Calculation #6—Average Total Risk $$\text{Average total risk} = \frac{\sum_{i}^{n}(\text{Risk Subcategory}_i \times \text{risk multiplier}_i)}{\sum_{1}^{n}\text{risk multiplier}_i}$$

n=number of sample points.
Risk Multiplier=3 for Risk Subcategory≥40,
Risk Multiplier=2 for 20≤Risk Subcategory<40
Risk Multiplier=1 for Risk Subcategory<20
Risk Calculation #7—Risks per Design Task:
The following 14 design tasks may be defined: Scenario, Trajectory, Mechanical Earth Model, Rig, Wellbore stability, Mud weight and casing points, Wellbore Sizes, Casing, Cement, Mud, Bit, Drillstring, Hydraulics, and Time design. There are currently as many as 54 individual risks specified, but one skilled in the art will appreciate more or less risks may be used.
Risk Calculation #7A—Potential Maximum Risk per Design Task $$\text{Potential Risk}_k = \frac{\sum_{j=1}^{55}(90 \times \text{Severity}_{k,j} \times N_{k,j})}{\sum_{j=1}^{55}(\text{Severity}_{k,j} \times N_{k,j})}$$

k=index of design tasks, there are 14 design tasks,
$N_j$=either 0 or 1 depending on whether the Risk Value$_j$ contributes to the design task.
0≤Severity≤5

Risk Calculation #7B—Actual Risk per Design Task $$\text{Actual Risk}_k = \frac{\sum_{j=1}^{55}(\text{Average Individual Risk}_j \times \text{Severity}_j \times N_{k,j})}{\sum_{j=1}^{55}(\text{Severity}_j \times N_{k,j})}$$

k=index of design tasks, there are 14 design tasks $N_{k,j} \in [0,\ldots,M]$

0≤Severity$_j$≤5
The "Severity" in the above equations may be defined as follows:

| Risk | Severity |
| --- | --- |
| H2S_CO2 | 2.67 |
| Hydrates | 3.33 |
| Well_WD | 3.67 |
| DLS | 3 |
| TORT | 3 |
| Well_MD | 4.33 |
| INC | 3 |
| Hor_Disp | 4.67 |
| DDI | 4.33 |
| PP_High | 4.33 |
| PP_Low | 2.67 |
| RockHard | 2 |
| RockSoft | 1.33 |
| TempHigh | 3 |
| Rig_WD | 5 |
| Rig_MD | 5 |
| SS_BOP | 3.67 |
| MW_Kick | 4 |
| MW_Loss | 3 |
| MW_Frac | 3.33 |
| MWW | 3.33 |
| WBS | 3 |
| WBSW | 3.33 |
| HSLength | 3 |
| Hole_Big | 2 |
| Hole_Sm | 2.67 |
| Hole_Csg | 2.67 |
| Csg_Csg | 2.33 |
| Csg_Bit | 1.67 |
| Csg_DF | 4 |
| Csg_Wt | 3 |
| Csg_MOP | 2.67 |
| Csg_Wear | 1.33 |
| Csg_Count | 4.33 |
| TOC_Low | 1.67 |
| Cmt_Kick | 3.33 |
| Cmt_Loss | 2.33 |
| Cmt_Frac | 3.33 |
| Bit_Wk | 2.33 |
| Bit_WkXS | 2.33 |
| Bit_Ftg | 2.33 |
| Bit_Hrs | 2 |
| Bit_Krev | 2 |
| Bit_ROP | 2 |
| Bit_UCS | 3 |
| DS_MOP | 3.67 |
| DS_Part | 3 |
| Kick_Tol | 4.33 |
| Q_Crit | 2.67 |
| Q_Max | 3.33 |
| Cutting | 3.33 |
| P_Max | 4 |
| TFA_Low | 1.33 |
| ECD_Frac | 4 |
| ECD_Loss | 3.33 |

The average Individual Risk may be calculated from the "Risk Values" as follows:

$$\text{Average individual risk} = \frac{\sum_{i}^{n} Riskvalue_i}{n}$$

The "Subcategory Risk", or "Risk Subcategory", may be calculated from the "Risk Values" and the "Severity", as defined above, as follows:

$$\text{Risk Subcategory} = \frac{\sum_{j}^{n}(Riskvalue_j \times severity_j \times N_j)}{\sum_{j}(severity_j \times N_j)}$$

The Average Subcategory Risk may be calculated from the Risk Subcategory in the following manner:

$$\text{Average subcategory risk} = \frac{\sum_{i}^{n}(\text{Risk } Subcategory_i \times \text{risk } multiplier_i)}{\sum_{1}^{n} \text{risk } multiplier_i}$$

The Risk Total may be calculated from the Risk Subcategory in the following manner:

$$\text{Risk Total} = \frac{\sum_{1}^{4} \text{Risk } subcategory_k}{4}$$

The Average Total Risk may be calculated from the Risk Subcategory in the following manner:

$$\text{Average total risk} = \frac{\sum_{i}^{n}(\text{Risk } Subcategory_i \times \text{risk } multiplier_i)}{\sum_{1}^{n} \text{risk } multiplier_i}$$

The Potential Risk may be calculated from the Severity, as defined above, as follow:

$$\text{Potential } Risk_k = \frac{\sum_{j=1}^{55}(90 \times Severity_{k,j} \times N_{k,j})}{\sum_{j=1}^{55}(Severity_{k,j} \times N_{k,j})}$$

The Actual Risk may be calculated from the Average Individual Risk and the Severity, as defined above, as follows:

$$\text{Actual } Risk_k = \frac{\sum_{j=1}^{55}(\text{Average Individual } Risk_j \times Severity_j \times N_{k,j})}{\sum_{j=1}^{55}(Severity_j \times N_{k,j})}$$

Figure 5:
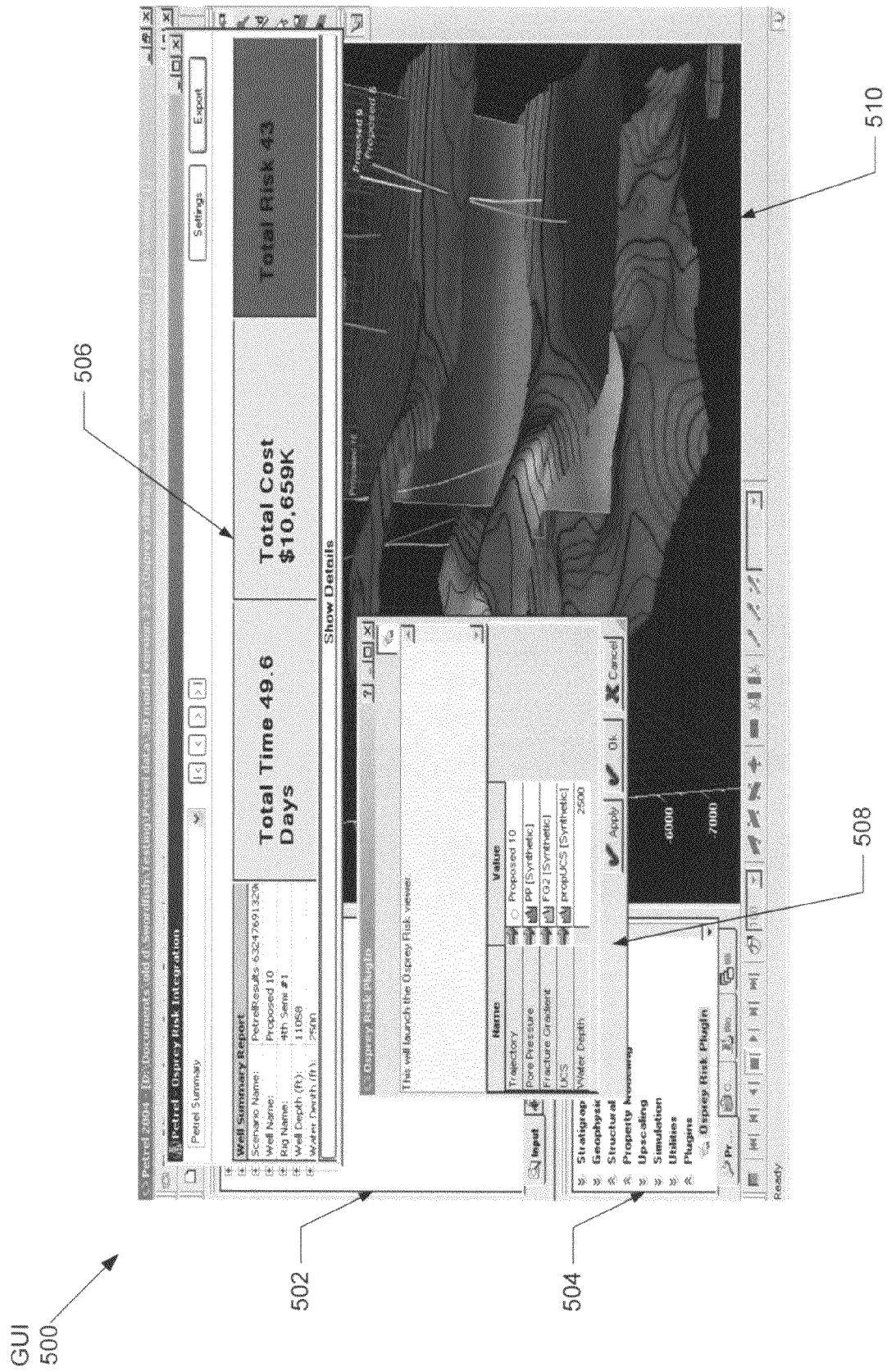
FIG. 5 shows a screen shot of the output of the WPS in a geological context.

FIG. 5 shows a graphical user interface (GUI) (500) within a geoscience application for displaying the risk assessment associated with a planned well. The GUI (500) may be displayed from a geoscience application that may be used to customize and display three-dimensional images of various properties associated with the planned well. The GUI (500) includes a task bar (502), a toolbar (504), an integrated display (506), an WPS input dialog (508), and a graphical visualization (510). Each of the aforementioned components of the GUI (500) is described in detail below.

The task bar (502) of the GUI (500) may include a list of the plurality of risk assessment tasks that can be selected by the user to input data, specify the wellbore geometry, specify drilling parameters, and output result parameters, such as the time and cost associated with the planned well. As mentioned above, the plurality of tasks are organized in an ordered system workflow in which the output of a previous task serves as the input to the next task. By selecting the tasks that the user wishes to provide data for and see displayed, the user can customize which tasks are associated with the risk assessment performed by the WPS.

Each of the risk assessment tasks may be associated with input data used to calculate risk information. The toolbar (504) shown in the GUI (500) is used to select the WPS from a hierarchical display of various functionalities that can be integrated with the geoscience application. Those skilled in the art will appreciate that selecting the WPS using the toolbar (504) integrates the WPS with the geoscience application.

Continuing with FIG. 5, when the WPS is selected from the toolbar (504), an WPS input dialog (508) is displayed for the user to input a trajectory and earth properties associated with the planned well. Based on the trajectory and earth properties that are input into the WPS input dialog (508), the WPS computes the well bore geometry, drilling parameters, risk assessment, and probabilistic distributions of the time and cost for the planned well. The aforementioned characteristics computed by the WPS are displayed in the integrated display (506) of the GUI (500). In addition, the graphical visualization (510) displays the color-coded risk assessment computed by the WPS in a geological context. As shown in FIG. 5, the graphical display (510) may display the contour of the geological surface on which the planned well is to be drilled, along with the calculated risk for each portion of the geological surface. As described above, the higher the risk number, the higher the risk in creating the planned well.

The above described risk categories and subcategory risks and individual risks may be visualized in two-dimensions (2D) [or potentially three-dimensions (3D)] along a depth in a wellbore by displaying a total "ranked risk category", a "ranked subcategory risk", and a "ranked individual risk". The 2D view of the risks may be displayed in two ways: the first way is by risk parameter, risk category, and risk summary vs. depth; and the second way is total risk vs. workflow task identifying the relative risk contribution of each technical design task in the workflow.

As a result of the nature by which the risks are calculated, an array of risk values are produced that can be visualized as a log. Logs are such a standard way of visualizing data in the oil and gas industry that it is a natural visualization technique for risk as well. These logs can be plotted in 2D or 3D. 2D logs have any number of methods of display allowing for infinite flexibility, however 3D offers something unique. Displaying the risk data in 3D with or without color scaling may also be very useful for creating visual risk volumes along the trajectory. Those skilled in the art will appreciate that risk data may also be displayed in 4-dimensions by adding the dimension of time.

These risk visualization techniques of the present invention are used to visualize risks in the 3D geoscience model and identify coincidence of risk levels and geological features. This enables users to draw correlations from the positional coincidence of risk and geophysical attributes, geological features, reservoir simulation results (like streamlines), mechanical stresses, and positional uncertainty of trajectory. Based on any discovery of correlation or other relationship, users can assess the benefits and drawbacks of modifying the position or design of the well to reduce the cost and/or risks associated with the well.

Risk information corresponding to the trajectory and earth properties is shown in a 3D display in a geological context within a geoscience application. That is, the color-coded risk levels corresponding to various trajectories for the planned well is displayed along with the path of the trajectory, the geological earth formations, and any other related information that is shown graphically in a geoscience application. Those skilled in the art will appreciate that using geoscience applications to produce 3D graphical representations of conceptual drilling wells is well known in the art.

Figure 6:
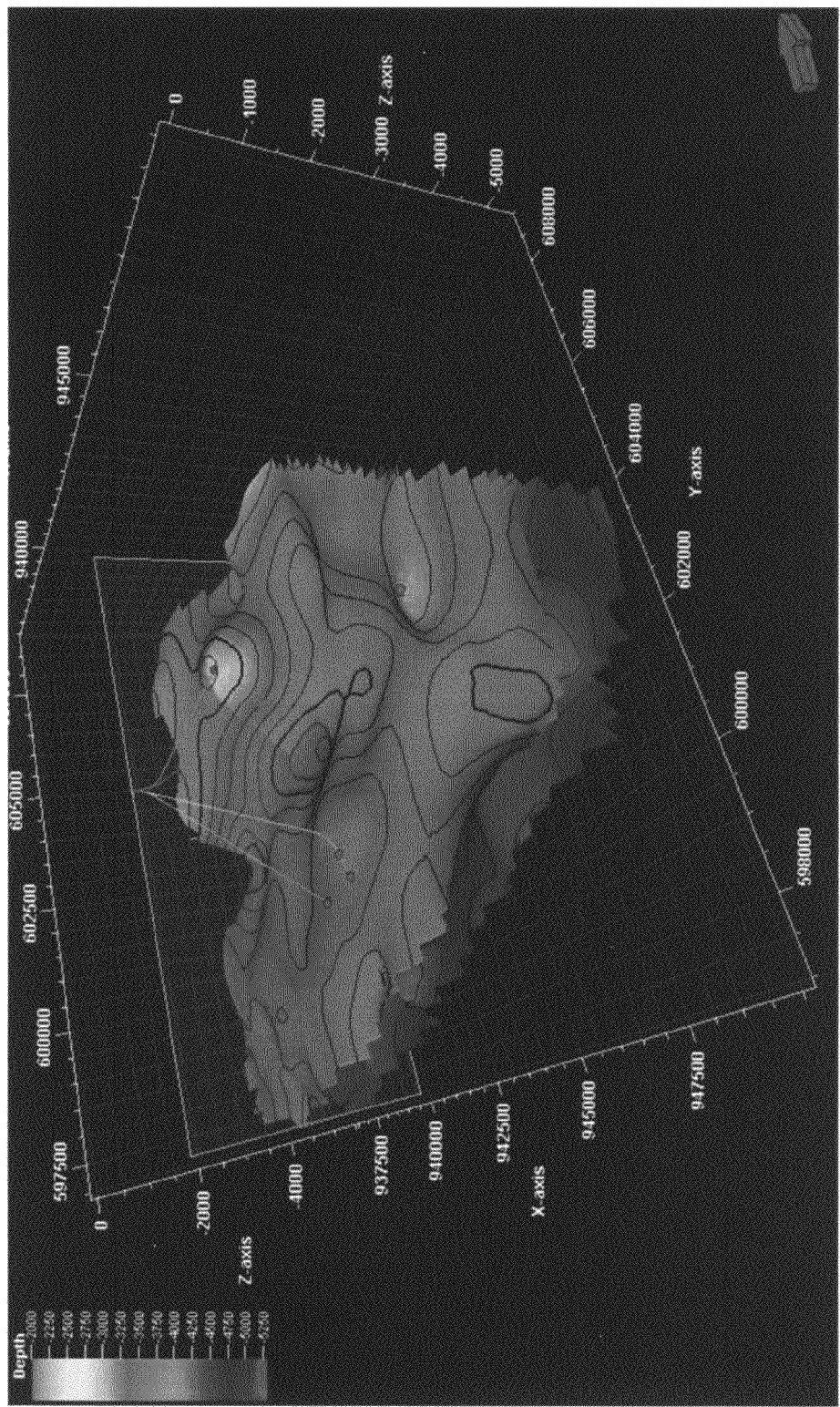
FIGS. 6-11 show examples of displaying risk information in a geological context.

FIGS. 6-11 show examples of displaying risk information in a geological context. FIG. 6 shows an example of a GUI (512) displaying a 3D image representing a conceptual drilling well in an earth formation, where the various colors represent the range of depth of the each area shown. FIG. 6 shows a contour map of the surface of the earth that is being drilled. Particularly, FIG. 6 shows the change in elevation of the geological marker (i.e., the geological surface). Thus, one contour line on the image of FIG. 6 represents a constant elevation along the shape of the geological marker. In addition, there are five trajectories (represented by the fives lines ending in red dots) for fives different drilling paths that start from the same initial location. The image shown in FIG. 6 represents a typical image that a geoscience application generates when simulating the earth model data, geomechanical earth properties, and input trajectories provided by a user.

Figure 7:
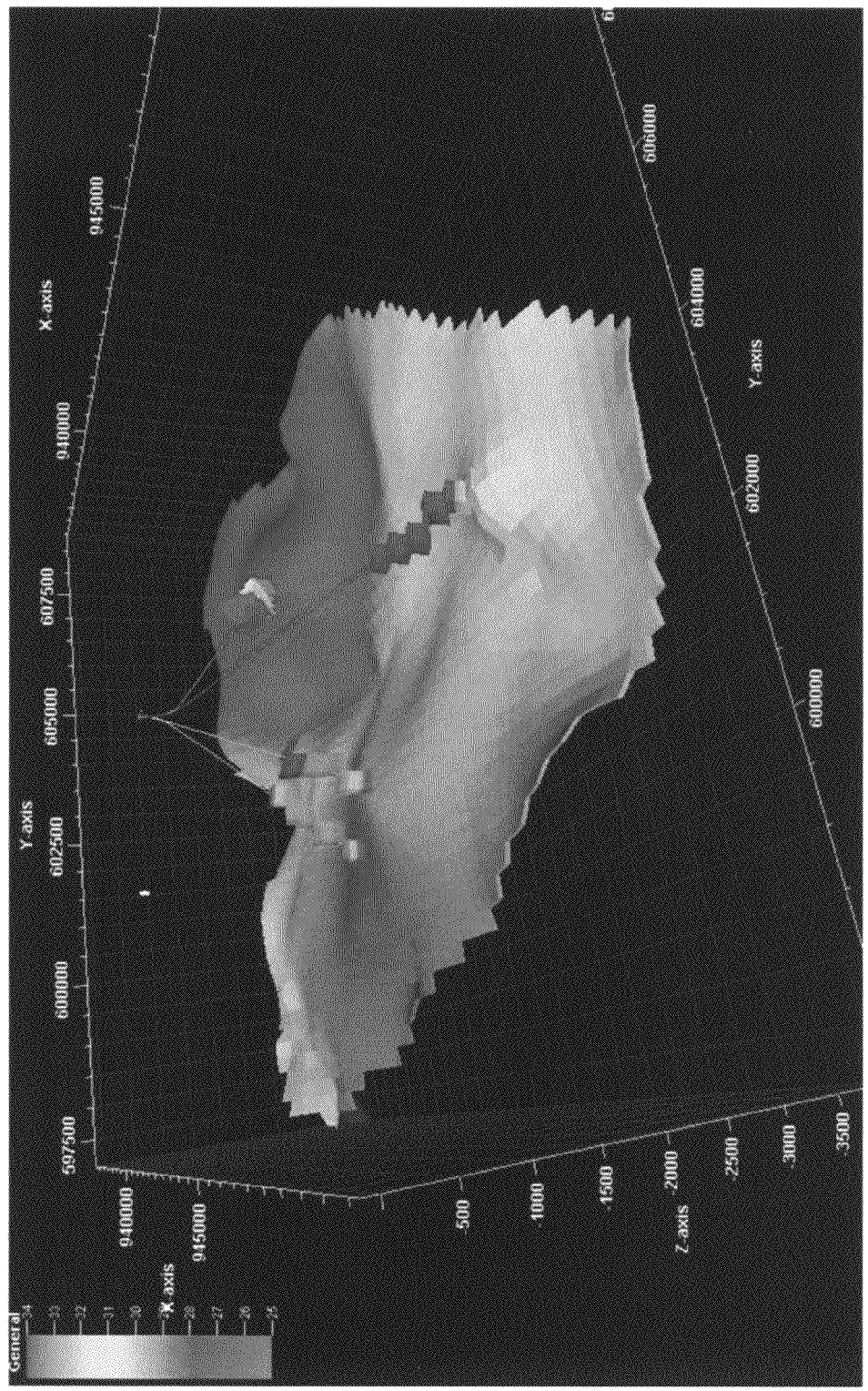

FIG. 7 shows a GUI (514) with risk information displayed in a geological context. Specifically, the risk information displayed in FIG. 7 is based on the graphical representation of a conceptual drilling well produced by a geoscience application and shown in FIG. 6. Thus, the color-coded risk information (e.g., red=high risk, yellow=medium risk, and green=low risk) is overlaid on the image shown in FIG. 6. In this manner, a user viewing the graphical representation of risk information can immediately recognize which geological areas are associated with high risk for a drilling well and which geological areas are associated with a medium or low risk for a drilling well. More specifically, FIG. 7 shows the risk at every portion of the formation and along each of the trajectory paths, moving in an upward direction. Those skilled in the art will appreciate that the visual display of risk information may also be color-coded with a color gradient, and is not limited to distinct colors. Thus, any combination of colors may be used to display information associated with the drilling well. Further, FIG. 7 shows risk information plotted along each trajectory path.

Figure 8:
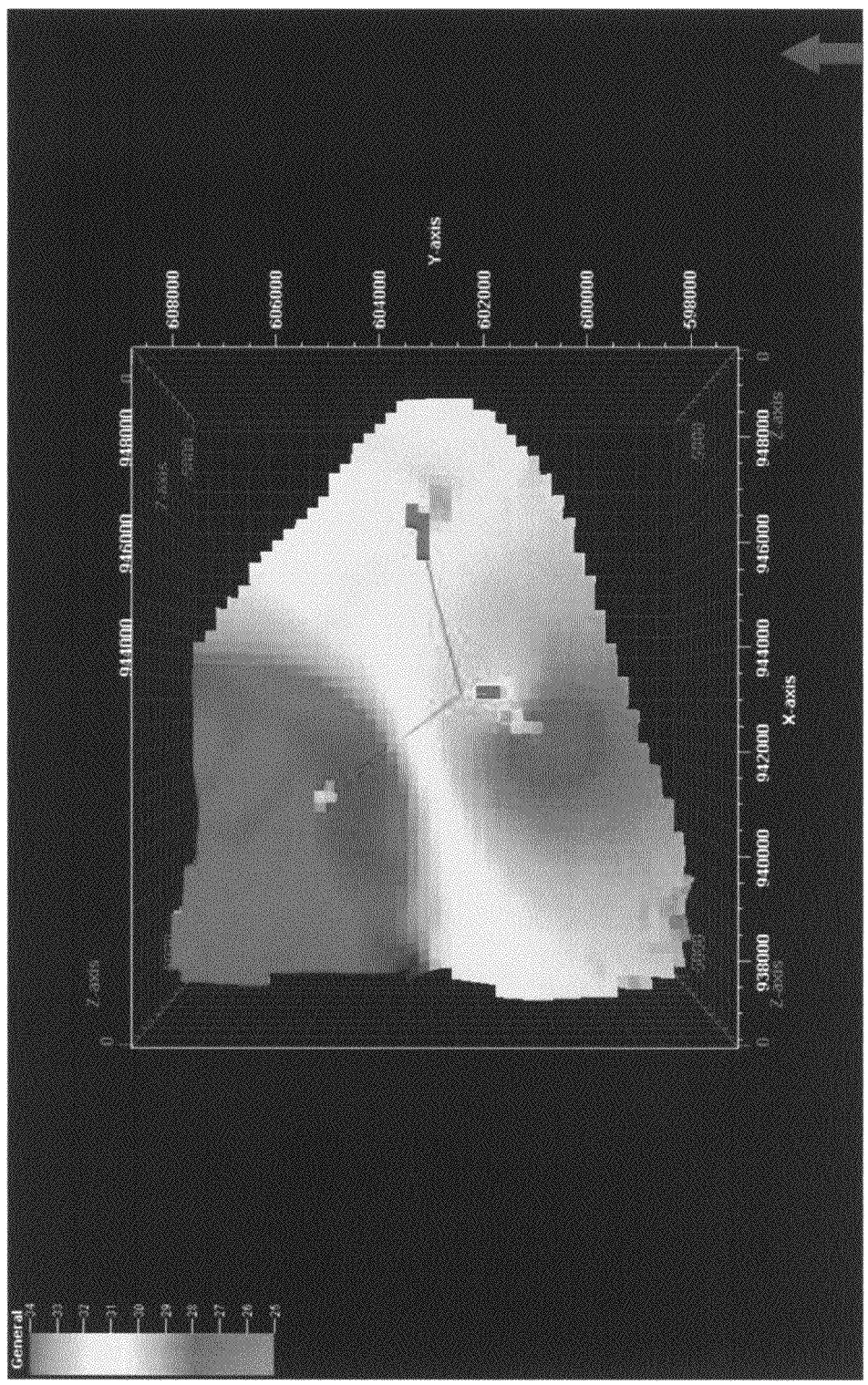
Figure 9:
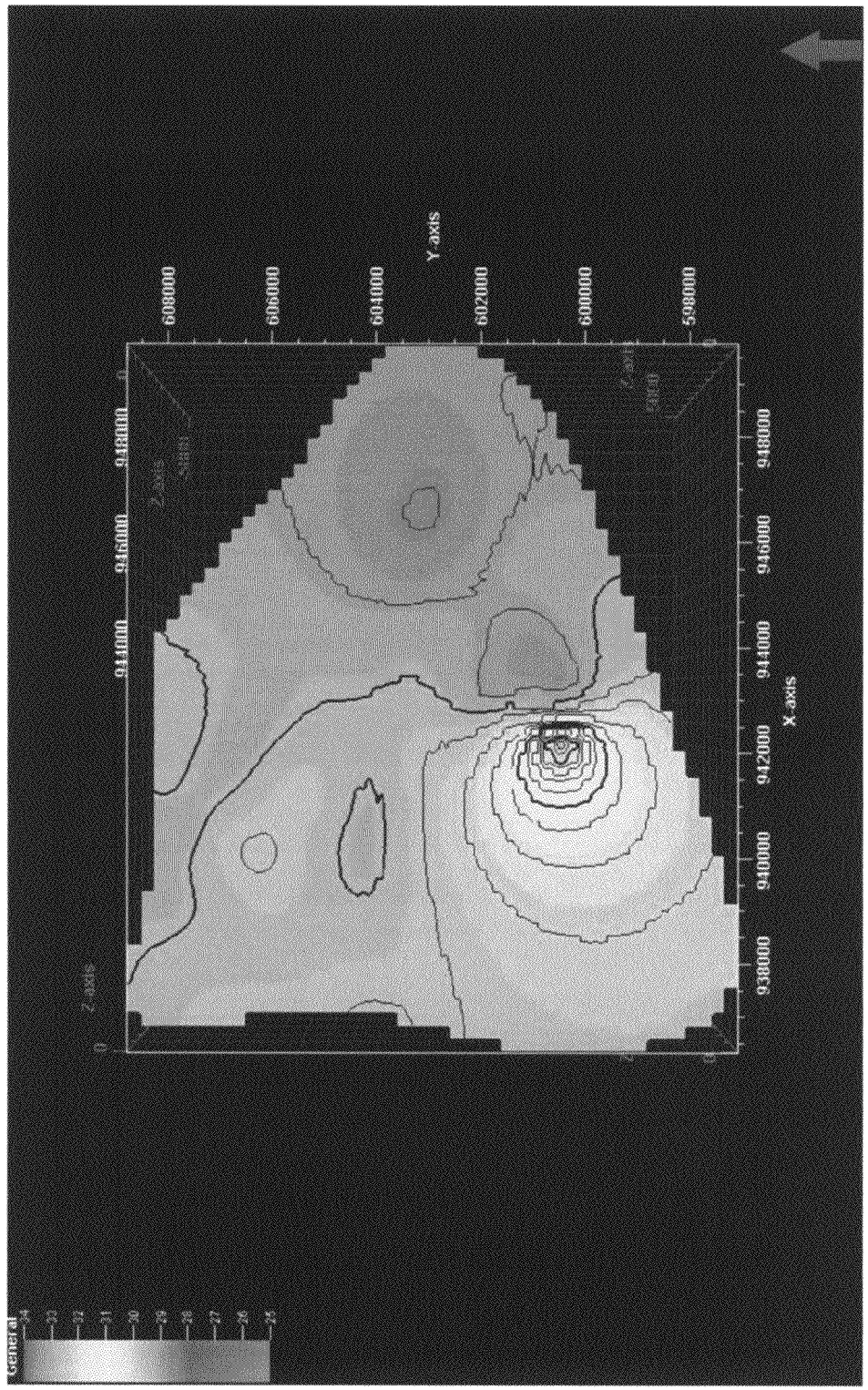

FIG. 8 shows a GUI (516) of the aerial view of FIG. 7. More specifically, FIG. 8 shows the risk information at a constant depth (represented by the vertical cross-section shown in the image). Risk information can be displayed at multiple vertical cross-section. Similarly, FIG. 9 shows GUI (518), which displays the risk associated with multiple vertical cross-sections of the geological marker that is aggregated/summed-up in one plane. This provides the viewer with an average risk of all or several vertical cross-sections so that the highest and the lowest areas of risk can be viewed in comparison to a particular depth.

Figure 10:
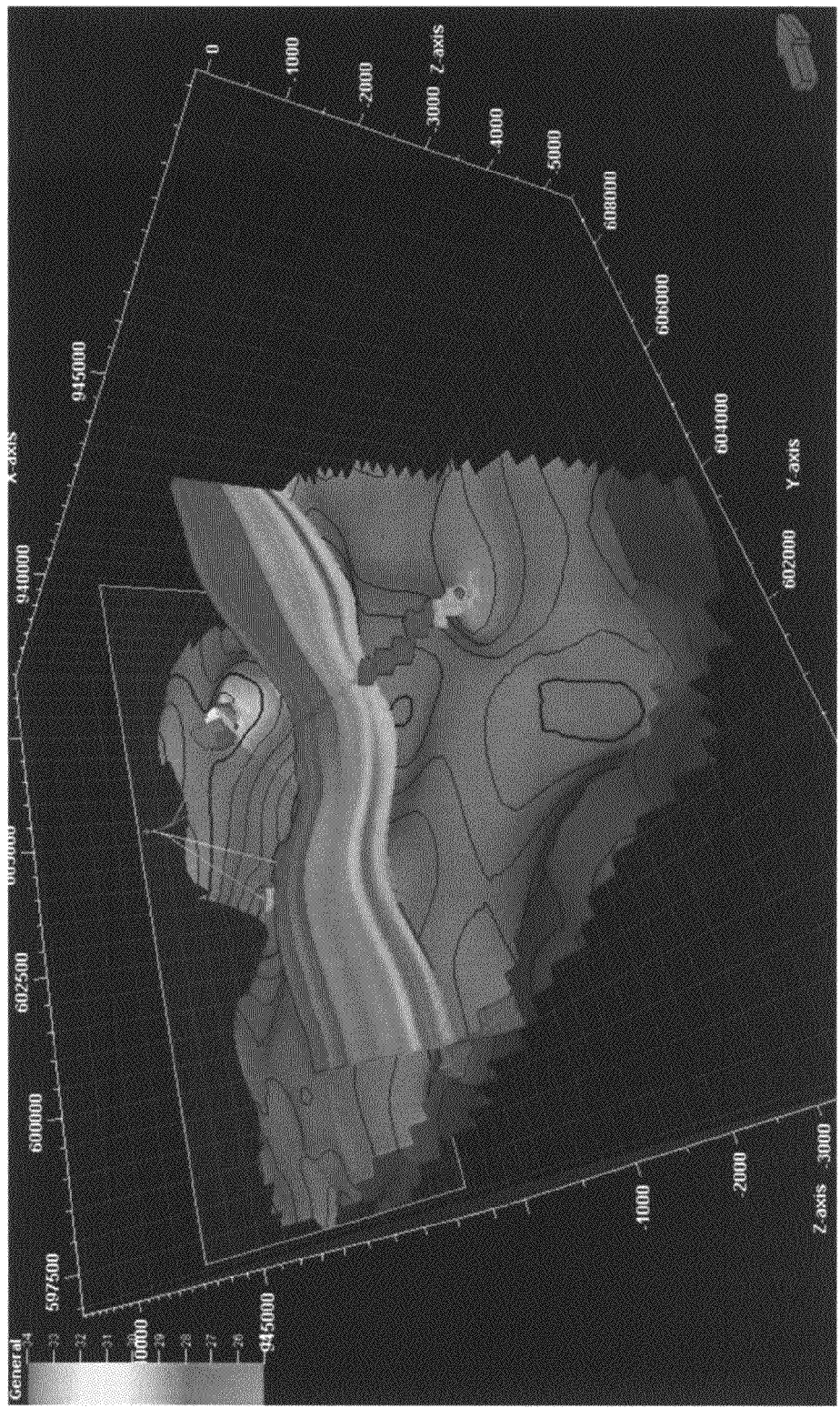
Figure 11:
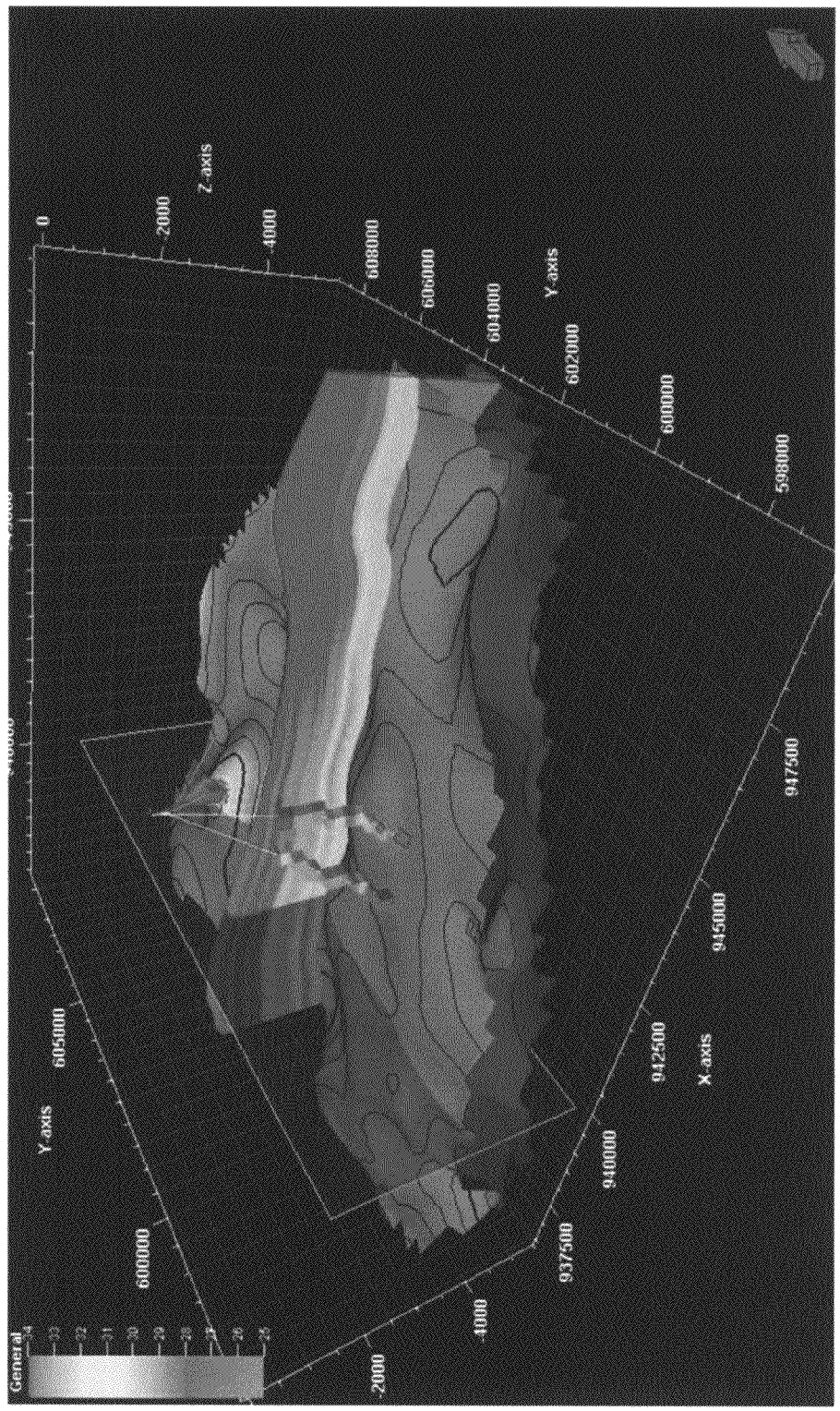

FIGS. 10 and 11 show GUI (520) and GUI (522), respectively, where risk information is plotted along the x and y interface (where z is the vertical interface discussed in FIGS. 8 and 9). Thus, a user can graphically view risk information along the x-y interface to examine the risks involved along the length and width of the geological marker.

Risks associated with well planning in a geological context that overlap or are interdependent are nicely displayed. Further, the invention allows viewing generalized risk level for the well at each depth (i.e., in a geological context). Further, the invention allows the user to see risk categories and individual risks individually or simultaneously in two dimension (2D) or 3D views. In addition, the invention provides for the visualization of the best risk optimal 3D trajectory in a 3D geological context (i.e., a 3D earth model).

Figure 12:
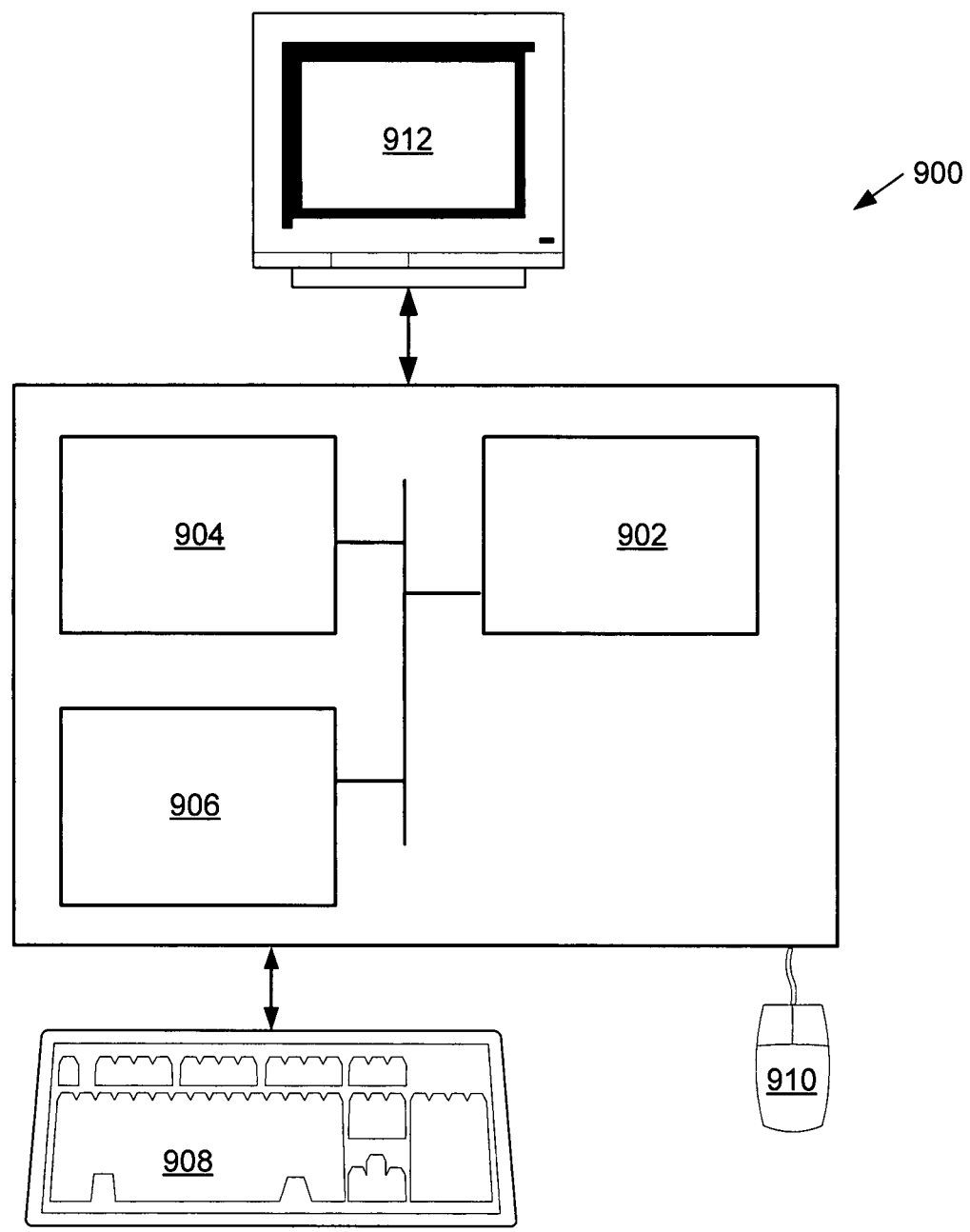
FIG. 12 shows a computer system.

The invention may be implemented on virtually any type of computer regardless of the platform being used. For example, as shown in FIG. 12, a computer system (900) includes a processor (902), associated memory (904), a storage device (906), and numerous other elements and functionalities typical of today's computers (not shown). The computer (900) may also include input means, such as a keyboard (908) and a mouse (910), and output means, such as a monitor (912). The computer system (900) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (900) may be located at a remote location and connected to the other elements over a network. Further, the invention may be implemented on a distributed system having a plurality of nodes, where each portion of the invention (e.g., the WPS, the geological program, etc.) may be located on a different node within the distributed system. The node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing oilfield operations for an oilfield having a subterranean formation with an underground reservoir therein, the oilfield being provided with at least one wellsite with oilfield equipment for extracting fluid from the underground reservoir, comprising:

collecting, by a geoscience application, data comprising trajectory and earth properties associated with a planned well for the geoscience application to obtain a geoscience model, wherein the geoscience application is geoscience modeling software;

invoking, in the geoscience application, a well planning system integrated with the geoscience application, wherein the well planning system is a plugin to the geoscience application;

extracting, by the well planning system, the trajectory and the earth properties from the geoscience model to obtain an extracted trajectory and extracted earth properties;

calculating, by a computer processor executing the well planning system, a plurality of individual risk indexes for a plurality of individual risks using the extracted trajectory and the extracted earth properties;

calculating, by the well planning system and using the plurality of individual risk indexes, a plurality of ranked risk category values for a plurality of ranked risk categories and a ranked subcategory risk index for a ranked subcategory risk, wherein said plurality of ranked risk categories comprises an average individual risk, a subcategory risk further calculated using the ranked subcategory risk index, an average subcategory risk further calculated using the ranked subcategory risk index, a total risk, an average total risk, a potential risk for each design task, and an actual risk for each design task; and displaying, in the geoscience application, the plurality of ranked risk category values within a geological context of the geoscience application, wherein displaying the plurality of ranked risk category values comprises displaying a visualization of the total risk versus the actual risk for each design task.

2. The method of claim 1, further comprising:
determining at least one selected from a group consisting of a time and a cost for the planned well.

3. The method of claim 1, further comprising:
computing a well bore geometry and drilling parameters for the planned well based on the extracted trajectory and the extracted earth properties.

4. The method of claim 2, wherein the time and the cost for the planned well comprise a probabilistic distribution of the time and the cost associated with the planned well.

5. The method of claim 1, wherein said ranked subcategory risk is at least one selected from a group consisting of gains risks, losses risks, stuck pipe risks, and mechanical risks.

6. The method of claim 1, wherein displaying the plurality of ranked risk category values comprises plotting the plurality of ranked risk category values and the rank subcategory risk index along said trajectory associated with said planned well.

7. The method of claim 1, wherein the earth properties comprise at least one selected from a group consisting of a pore pressure, a fracture gradient, and an unconfined compressive rock strength.

8. The method of claim 2, wherein said plurality of ranked risk category values is displayed within said geological context in at least one selected from the group consisting of three-dimensions and four-dimensions.

9. The method of claim 1, further comprising:
selecting a plurality of risk assessment tasks, wherein each of said plurality of risk assessment tasks is associated with the trajectory and said earth properties.

10. The method of claim 9, wherein said plurality of risk assessment tasks is arranged in a system workflow, and wherein an output of each of said plurality of risk assessment tasks is used as input to a subsequent risk assessment task.

11. The method of claim 1, wherein the trajectory and the earth properties are represented in three-dimensions (3D).

12. A system for a graphical user interface (GUI) associated with a geoscience application for performing oilfield operations for an oilfield having a subterranean formation with an underground reservoir therein, the oilfield being provided with at least one wellsite with oilfield equipment for extracting fluid from the underground reservoir, wherein the system comprises:

a computer processor; and memory comprising instructions, which when executed by the computer processor, cause the computer processor to display the GUI comprising:

a task bar configured to:

display a plurality of risk assessment tasks for selection, wherein each of said plurality of risk assessment tasks is associated with a trajectory and earth properties used to calculate risk information; and a toolbar configured to display a well planning system for selection, wherein the well planning system is integrated with said geoscience application upon selection, and wherein the well planning system is configured to:

calculate, by a computer processor executing the well planning system, a plurality of individual risk indexes for a plurality of individual risks using the trajectory and the earth properties, and calculate, by the well planning system and using the plurality of individual risk indexes, a plurality of ranked risk category values for a plurality of ranked risk categories and a ranked subcategory risk index for a ranked subcategory risk, wherein said plurality of ranked risk categories comprises an average individual risk, a subcategory risk further calculated using the ranked subcategory risk index, an average subcategory risk further calculated using the ranked subcategory risk index, a total risk, an average total risk, a potential risk for each design task, and an actual risk for each design task, wherein the GUI is configured to display the plurality of ranked risk category values within a geological context of the geoscience application, wherein displaying the plurality of ranked risk category values comprises displaying a visualization of the total risk versus the actual risk for each design task, wherein the geoscience application is geoscience modeling software, and wherein the well planning system is a plugin to the geoscience application.

13. The system of claim 12, further comprising:
determining at least one selected from a group consisting of a time and a cost for the planned well.

14. The system claim 12, wherein the GUI is further configured to display a well bore geometry and drilling parameters associated with the planned well.

15. The system of claim 12, wherein selecting the well planning system displays a configuration dialog box configured to receive the trajectory and said earth properties input by a user.

16. The system of claim 12, wherein said earth properties comprises at least one selected from a group consisting of a pore pressure, a fracture gradient, and an unconfined compressive rock strength.

17. The system of claim 12, wherein said plurality of risk assessment tasks is arranged in a system workflow wherein an output of each of said plurality of risk assessment tasks is used as input to a subsequent risk assessment task.

18. The system of claim 12, wherein the displaying the plurality of ranked risk category values comprises plotting the plurality of ranked risk category values and the rank subcategory risk index along the trajectory in at least one selected from the group consisting of a three-dimensional graphical display and a four-dimensional graphical display.

19. The system of claim 12, wherein the trajectory and the earth properties are represented in three-dimensions (3D).

20. A well planning system for performing oilfield operations for an oilfield having a subterranean formation with an underground reservoir therein, the oilfield being provided with at least one wellsite with oilfield equipment for extracting fluid from the underground reservoir, comprising:
a computer processor;
an input apparatus configured to extract a trajectory and earth properties associated with the trajectory from a geoscience model in a geoscience application to obtain an extracted trajectory and extracted earth properties, wherein the trajectory and earth properties are associated with a planned well, wherein the geoscience application is geoscience modeling software;
a calculation apparatus executing on the computer processor and configured to:
calculate a plurality of individual risk indexes for a plurality of individual risks using the extracted trajectory and the extracted earth properties; and
calculate, using the plurality of individual risk indexes, a plurality of ranked risk category values for a plurality of ranked risk categories and a ranked subcategory risk index for a ranked subcategory risk, wherein said plurality of ranked risk categories comprises an average individual risk, a subcategory risk further calculated using the ranked subcategory risk index, an average subcategory risk further calculated using the ranked subcategory risk index, a total risk, an average total risk, a potential risk for each design task, and an actual risk for each design task; and
a display apparatus configured to display the plurality of ranked risk category values within a geological context of the geoscience application, wherein displaying the plurality of ranked risk category values comprises displaying a visualization of the total risk versus the actual risk for each design task,
wherein the well planning system is a plugin to the geoscience application.

21. The system of claim 20, wherein the calculation apparatus is further configured to compute at least one selected from a group consisting of a time and a cost for the planned well.

22. The system of claim 21, wherein the time and cost computed by the well planning system comprises a probabilistic distribution of the time and cost associated with the planned well.

23. The system of claim 20, wherein said ranked subcategory risk is at least one selected from a group consisting of gains risks, losses risks, stuck pipe risks, and mechanical risks.

24. The system of claim 21, wherein displaying the plurality of ranked risk category values comprises plotting said plurality of ranked risk category values and the ranked subcategory risk index along the trajectory associated with the planned well.

25. The system of claim 20, wherein the earth properties associated with the trajectory comprise at least one selected from a group consisting of a pore pressure, a fracture gradient, and an unconfined compressive rock strength.

26. The system of claim 21, wherein the plurality of ranked risk category values is displayed within said geological context in at least one selected from the group consisting of three-dimensions and four-dimensions.

27. The system of claim 20, wherein the trajectory and the earth properties are represented in three-dimensions (3D).

28. A non-transitory computer usable medium for performing oilfield operations for an oilfield having a subterranean formation with an underground reservoir therein, the oilfield being provided with at least one wellsite with oilfield equipment for extracting fluid from the underground reservoir, wherein the computer usable medium comprises computer readable program code embodied therein for causing a computer system to:
collect data comprising trajectory and earth properties associated with a planned well for a geoscience application to obtain a geoscience model;
invoke a well planning system integrated with the geoscience application;
extract the trajectory and the earth properties from the geoscience model to obtain an extracted trajectory and extracted earth properties;
calculate a plurality of individual risk indexes for a plurality of individual risks using the extracted trajectory and the extracted earth properties;
calculate, using the plurality of individual risk indexes, a plurality of ranked risk category values for a plurality of ranked risk categories and a ranked subcategory risk index for a ranked subcategory risk, wherein said plurality of ranked risk categories comprises an average individual risk, a subcategory risk further calculated using the ranked subcategory risk index, an average subcategory risk further calculated using the ranked subcategory risk index, a total risk, an average total risk, a potential risk for each design task, and an actual risk for each design task; and
display the plurality of ranked risk category values within a geological context of the geoscience application, wherein displaying the plurality of ranked risk category values comprises displaying a visualization of the total risk versus the actual risk for each design task.

29. The non-transitory computer usable medium of claim 28, wherein the computer usable medium further comprises computer readable program code embodied therein for causing the computer system to determine at least one selected from a group consisting of a time and a cost for the planned well.

* * * * *